(12) United States Patent
Roldan

(10) Patent No.: US 9,894,927 B1
(45) Date of Patent: Feb. 20, 2018

(54) SYSTEMS AND METHODS FOR MAKING VEGETABLE PRODUCT FOOD HOLDERS

(71) Applicant: Pro-Team Buns, LLC, Murrieta, CA (US)

(72) Inventor: Arthur Roldan, Murrieta, CA (US)

(73) Assignee: Pro-Team Buns, LLC, Murrieta, CA (US)

( * ) Notice: Subject to any disclaimer, the term of this patent is extended or adjusted under 35 U.S.C. 154(b) by 0 days.

(21) Appl. No.: 15/621,977

(22) Filed: Jun. 13, 2017

Related U.S. Application Data

(60) Provisional application No. 62/506,610, filed on May 16, 2017.

(51) Int. Cl.
*A23P 30/10* (2016.01)
*A23L 19/00* (2016.01)

(52) U.S. Cl.
CPC ............... *A23P 30/10* (2016.08); *A23L 19/03* (2016.08); *A23V 2002/00* (2013.01)

(58) Field of Classification Search
CPC ........ B65D 65/463; A23P 30/00; A23L 19/03; A23L 19/00
See application file for complete search history.

(56) References Cited

U.S. PATENT DOCUMENTS

| 4,837,895 A * | 6/1989 | Emsens ............... A22C 17/006 452/174 |
| 2005/0271776 A1 | 12/2005 | Siegel |
| 2006/0134271 A1 | 6/2006 | Proper et al. |
| 2014/0178550 A1* | 6/2014 | Slutsky ................. A47J 43/20 426/512 |
| 2016/0066587 A1 | 3/2016 | Trinh et al. |

FOREIGN PATENT DOCUMENTS

| CN | 205058175 | 3/2016 |
| EP | 2471381 | 7/2012 |
| EP | 2725931 | 5/2014 |
| WO | WO2014186536 | 11/2014 |

* cited by examiner

*Primary Examiner* — Viren A Thakur
*Assistant Examiner* — Thanh H Nguyen
(74) *Attorney, Agent, or Firm* — Knobbe Martens Olson & Bear, LLP

(57) ABSTRACT

Systems and methods for forming vegetable product food holders. The method may include placing a first layer of vegetable product into a mold and forming the first layer of vegetable product to the mold. The method may also include various other steps. For example, the method may include placing a second layer of vegetable product into the mold and forming the second layer of vegetable product to the mold. For example, the method may include perforating the first layer of vegetable product while under within the mold, and/or chilling the first layer of vegetable product while inside the mold. The method may include increasing the flexibility of the vegetable product prior to insertion into the mold by perforating the vegetable product using an array of prongs.

26 Claims, 18 Drawing Sheets

SYSTEMS AND METHODS FOR MAKING VEGETABLE PRODUCT FOOD HOLDERS

INCORPORATION BY REFERENCE TO ANY PRIORITY APPLICATIONS

This application claims priority benefit of U.S. Provisional Application No. 62/506,610, filed on May 16, 2017. All of the above applications are incorporated by reference herein and are to be considered a part of this specification. Any and all applications for which foreign or domestic priority claim is identified in the Application Data Sheet as filed with the present application are hereby incorporated.

BACKGROUND

Field

The present application relates generally to systems and methods for producing vegetable product food holders, and more specifically, relates to systems and methods for producing lettuce leaf buns for sandwich style foods, including, but not limited to, hamburger buns, hot dog buns, submarine sandwich buns, etc.

Description of the Related Art

Hamburgers are a popular fast food product, which typically include a cooked patty of ground meat that is placed inside a sliced bread roll or hamburger bun. Many fast food restaurants also sell other types of sandwiches, including, for example, chicken sandwiches, fish sandwiches, hot dogs, sub sandwiches, roast beef sandwiches, and/or ham sandwiches.

SUMMARY

In some embodiments, a method of forming a food holder out of a vegetable product comprises placing a first layer of the vegetable product into a first portion of a mold comprising the first portion and a second portion, forming the first layer of the vegetable product to an inner surface of the first portion of the mold, placing a second layer of the vegetable product into the first portion of the mold, forming the second layer of the vegetable product to at least one of an inner surface of the first portion of the mold and the first layer of the vegetable product, and closing the mold.

The method may further comprise pushing a plurality of perforator prongs through the first layer of the vegetable product and the second layer of the vegetable product, thereby creating a plurality of holes through the first layer of the vegetable product and the second layer of the vegetable product. The method may further comprise withdrawing the plurality of perforator prongs through the first layer of the vegetable product and the second layer of the vegetable product. The method may further comprise at least one of pulling at least one of pieces and fibers of the first layer of the vegetable product through at least one hole of the plurality of holes in the first layer of the vegetable product using the plurality of perforator prongs and pulling at least one of pieces and fibers of the second layer of the vegetable product through at least one hole of the plurality of holes in the second layer of the vegetable product using the plurality of perforator prongs. The method may further comprise compressing the first layer of the vegetable product in the first portion of the mold. The method may further comprise placing an inflexible barrier over the first layer of the vegetable product before compressing the first layer of the vegetable product in the first portion of the mold. The method may further comprise compressing the second layer of the vegetable product in the first portion of the mold. The method may further comprise placing an inflexible barrier over the second layer of the vegetable product before compressing the second layer of the vegetable product in the first portion of the mold. The method may comprise keeping the second layer of the vegetable product separate from the first layer of the vegetable product. The method may comprise making the second layer of the vegetable product continuous with the first layer of the vegetable product. The vegetable product used in the method may comprise at least one of lettuce and cabbage. The vegetable product used in the method may comprise iceberg lettuce. The method may further comprise placing a first sheet of flexible barrier material into the first portion of the mold before placing the first layer of the vegetable product into the first portion of the mold. The first sheet of flexible barrier material used in the method may comprise plastic wrap. The method may further comprise placing a second sheet of flexible barrier material into the first portion of the mold before placing the second layer of the vegetable product into the first portion of the mold. The second sheet of flexible barrier material used in the method may comprise plastic wrap. The first portion of the mold used in the method may comprise a plurality of holes configured to accept the plurality of perforator prongs. The plurality of holes used in the method may comprise an arrangement in a ring on an outer surface of the first portion of the mold. The plurality of perforator prongs used in the method may comprise at least one of cylindrical needle coring prongs, solid pin prongs, diagonal needle coring prongs, hook prongs, arrow prongs, and corkscrew prongs. The method may further comprise chilling the first layer of vegetable product and the second layer of vegetable product in the mold, after chilling, opening the mold, and removing the first layer of vegetable product and the second layer of vegetable product from the mold. Pushing the plurality of perforator prongs used in the method through the first layer of vegetable product and the second layer of vegetable product may be prior to chilling the first layer of vegetable product and the second layer of vegetable product in the mold. The method may further comprise perforating the first layer of the vegetable product prior to placing the first layer of the vegetable product into the first portion of the mold. The method may further comprise perforating the second layer of the vegetable product prior to placing the second layer of the vegetable product into the first portion of the mold. Placing the first layer of the vegetable product used in the method into the first portion of the mold may comprise folding at least one edge of the first layer of the vegetable product onto the first layer of the vegetable product and towards a center of the mold. The first portion of the mold used in the method may comprise a hollow portion comprising a rounded top and a cylindrical wall. The second portion of the mold used in the method may comprise a cylinder configured to fit at least partially inside the cylindrical wall of the first portion of the mold and reversibly couple thereto. Closing the mold used in the method may comprise coupling the first portion to the second portion. A food holder formed out of a vegetable product according to the method. A sandwich comprising the food holder formed out of a vegetable product according to the method.

In some embodiments, a method of increasing the flexibility of a vegetable product may comprise perforating the vegetable product with an array of pins.

The array of pins used in the method may comprise a pin density of at least 16 pins per in2. Each pin of the array pins used in the method may comprise a diameter of no larger than about 0.04 inches. The vegetable product used in the method may comprise at least one of a lettuce leaf and a cabbage leaf.

In some embodiments, a food holder is provided consisting essentially of a vegetable product, the food holder comprises a first layer of the vegetable product, at least a portion of the first layer of the vegetable product extending through holes in the first layer of the vegetable product, and a second layer of the vegetable product, at least a portion of the second layer of the vegetable product extending through holes in the second layer of the vegetable product.

In some embodiments, a method of forming a food holder out of a vegetable product may comprise placing a first portion of the vegetable product into a mold, forming the first portion of the vegetable product to an inner surface of the mold, and closing the mold.

The method may further comprise advancing a plurality of tines at least partially through the first portion of the vegetable product. The method may further comprise retracting the plurality of tines from within the first portion of the vegetable product, wherein retracting the plurality of tines comprises leaving a plurality of holes in the first portion of the vegetable product. Retracting the plurality of tines used in the method may comprise pulling at least one of pieces and fibers of the first portion of the vegetable product through at least one hole of the plurality of holes in the first portion of the vegetable product. The mold used in the method may comprise a plurality of openings configured to accept the plurality of tines. The plurality of tines used in the method may comprise at least one of cylindrical needle coring prongs, solid pin prongs, diagonal needle coring prongs, hook prongs, arrow prongs, and corkscrew prongs. The method may further comprise compressing the first portion of the vegetable product in the mold. Compressing the first portion of the vegetable product used in the method may comprise placing a compression disc over the first portion of the vegetable product. The vegetable product used in the method may comprise at least one of lettuce and cabbage. The vegetable product used in the method may comprise iceberg lettuce. The method may further comprise lining at least a portion of the mold with a first barrier material before placing the first portion of the vegetable product into the mold. The first barrier material used in the method may comprise plastic wrap. The method may further comprise chilling the first portion of the vegetable product, opening the mold, and removing the first portion of the vegetable product from the mold. Advancing the plurality of tines used in the method at least partially through the first portion of the vegetable product may be prior to chilling the first portion of the vegetable product. The method may further comprise perforating the first portion of the vegetable product prior to placing the first portion of the vegetable product into the mold. The mold used in the method may comprise a hollow portion comprising a closed top, an open bottom, and a wall. The mold used in the method may further comprise a base configured to at least one of fit at least partially inside the wall of the hollow portion and at least partially cover the open bottom of the hollow portion. Closing the mold used in the method may comprise coupling the base to the hollow portion. Coupling the base used in the method to the hollow portion may comprise at least partially covering the open bottom of the hollow portion. The method may further comprise placing a second portion of the vegetable product into the mold, and forming the second portion of the vegetable product to an inner surface of the mold. The method may further comprise compressing the second portion of the vegetable product in the mold. Compressing the second portion of the vegetable product used in the method may comprise placing a compression disc over the second portion of the vegetable product. The method may comprise keeping the second portion of the vegetable product separate from the first portion of the vegetable product. The method may comprise making the second portion of the vegetable product continuous with the first portion of the vegetable product. The method may further comprise lining at least a portion of the mold with a second barrier material before placing the second portion of the vegetable product into the mold. The second barrier material used in the method may comprise plastic wrap. The method may further comprise chilling the second portion of the vegetable product, opening the mold, and removing the second portion of the vegetable product from the mold. The method may further comprise perforating the second portion of the vegetable product prior to placing the second portion of the vegetable product into the mold. The method may further comprise placing a second portion of the vegetable product into the mold, and forming the second portion of the vegetable product to an inner surface of the mold. The method may further comprise advancing the plurality of tines at least partially through the second portion of the vegetable product. The method may further comprise retracting the plurality of tines from within the second portion of the vegetable product, wherein retracting the plurality of tines comprises leaving a plurality of holes in the second portion of the vegetable product. Retracting the plurality of tines used in the method may comprise pulling at least one of pieces and fibers of the second portion of the vegetable product through at least one hole of the plurality of holes in the second portion of the vegetable product. The method may further comprise compressing the second portion of the vegetable product in the mold. Compressing the second portion of the vegetable product used in the method may comprise placing a compression disc over the second portion of the vegetable product. The method may comprise keeping the second portion of the vegetable product separate from the first portion of the vegetable product. The method may comprise making the second portion of the vegetable product continuous with the first portion of the vegetable product. The method may further comprising lining at least a portion of the mold with a second barrier material before placing the second portion of the vegetable product into the mold. The second barrier material used in the method may comprise plastic wrap. The method may further comprise chilling the second portion of the vegetable product, opening the mold, and removing the second portion of the vegetable product from the mold. Advancing the plurality of tines used in the method at least partially through the second portion of the vegetable product may be prior to chilling the second portion of the vegetable product. The method may further comprise perforating the second portion of the vegetable product prior to placing the second portion of the vegetable product into the mold. A food holder formed out of a vegetable product according the method. A sandwich comprising the food holder formed out of a vegetable product according the method.

In some embodiment, a food holder mold set comprises a top portion comprising a top surface, a wall, an open bottom, and a cavity at least partially defined by the top surface and the wall, a compression disc configured to be reversibly inserted through the open bottom and into the cavity and reversibly reduce a volume of the cavity, a bottom portion configured to reversibly couple to the top portion and cover at least a portion of the open bottom.

The top portion may comprise a plurality of holes through the top surface of the top portion. The plurality of holes may comprise an arrangement in a ring around an outer circumference of the top surface of the top portion. The plurality of holes may comprise an arrangement in a recognizable pattern on the top surface of the top portion. The plurality of holes may be configured to accept a plurality of prongs and allow the plurality of prongs to extend into the cavity of the top portion. The wall of the top portion may comprise at least one of a round perimeter, an oblong perimeter, and an oval perimeter. The top surface of the top portion may comprise at least one of a hemispherical surface, a domed surface, and a curved surface. The food holder mold set may be configured to make at least a first portion of a food holder out of a vegetable product. The top surface of the top portion may comprise a substantially flat surface. The food holder mold set may be configured to make at least a second portion of a food holder out of a vegetable product. The food holder mold set may be configured to make an entire food holder out of a vegetable product, wherein the entire food holder comprises a first portion of the food holder and a second portion of the food holder. The top portion may comprise an inner thread. The inner thread may be disposed on an inner surface of the wall. The bottom portion may comprise an outer thread configured to mate with the inner thread of the top portion. The outer thread of the bottom portion and the inner thread of the top portion may be configured to reversibly couple the bottom portion to the top portion. The top portion may comprise at least one key slot and the compression disc may comprise at least one key tab configured to mate with the key slot. The compression disc may comprise a plurality of disc holes. Alignment of the at least one key tab of the compression disc with the at least one key slot of the top portion may align the plurality of disc holes with the plurality of holes in the top surface of the top portion. The top portion may be configured to accept a vegetable product and form one of a hot dog food holder, a hamburger food holder, and a sub sandwich food holder. A food holder made using the fold holder mold set. A sandwich made using the food holder made using the fold holder mold set.

In some embodiments, a vegetable product perforator may comprise an array of tines, wherein the array of tines is configured to pierce a vegetable product, wherein piercing the vegetable product comprises passing through the vegetable product to create at least one hole in the vegetable product and withdrawing from the at least one hole in the vegetable product.

The vegetable product may comprise at least one of cabbage and lettuce. The array of tines may be configured to make the vegetable product more flexible upon withdrawing the array of tines from the at least one hole in the vegetable product. The array of tines may be configured to pull at least one of fibers and pieces of the vegetable product through the at least one hole in the vegetable product upon withdrawing the array of tines from the at least one hole in the vegetable product. The array of tines may be configured to cause at least a first portion of the vegetable product to adhere to at least a second portion of the vegetable product. The array of tines may be configured to fix at least the first portion of the vegetable product to at least the second portion of the vegetable product. The array of tines may comprise at least one of a cylindrical needle prong, a pin prong, a diagonal needle prong, a hook prong, an arrow prong, and a corkscrew prong. A vegetable product perforator jig may comprise the vegetable product perforator. The vegetable product perforator jig may be configured to hold a vegetable product mold set having a plurality of holes and the vegetable product perforator so that the array of tines may enter the plurality of holes and pass into an interior of the vegetable product mold set.

BRIEF DESCRIPTION OF THE DRAWINGS

FIG. 2A shows the various and disassembled components of an embodiment of a the bun mold set. FIG. 2B shows an embodiment of the bun mold set in an assembled configuration. FIG. 2C shows an embodiment of the top of the bun mold set and various included apertures.

FIG. 8A shows an embodiment of a keyed bun mold top. FIG. 8B shows an embodiment of a keyed bun mold compression disk.

FIG. 10A shows an embodiment of a cylindrical needle prong. FIG. 10B shows an embodiment of a pin prong. FIG. 10C shows an embodiment of a diagonal needle prong. FIG. 10D shows an embodiment of a hook prong. FIG. 10E shows an embodiment of an arrow prong. FIG. 10F shown an embodiment of a corkscrew prong.

DETAILED DESCRIPTION

The bread of sandwich products generally has high carbohydrate content and is typically high in calories and low in nutrients. Some fast food and other restaurant chains have made available, on or off-menu, lettuce-wrapped burgers, which are essentially a hamburger patty (or any other filling, such as a hot dog) and, optionally, condiments wrapped in a lettuce leaf. Lettuce-wrapped sandwiches frequently tend to fall apart quickly as the lettuce breaks or cracks and/or as the contents slide around, making them messy to eat, which may require an unwieldy wrapping paper around the lettuce wrapping. As such, these lettuce-wrapped sandwiches suffer from a low popularity amongst sandwich buyers, even those who would generally prefer a healthier sandwich.

Figure 1A:
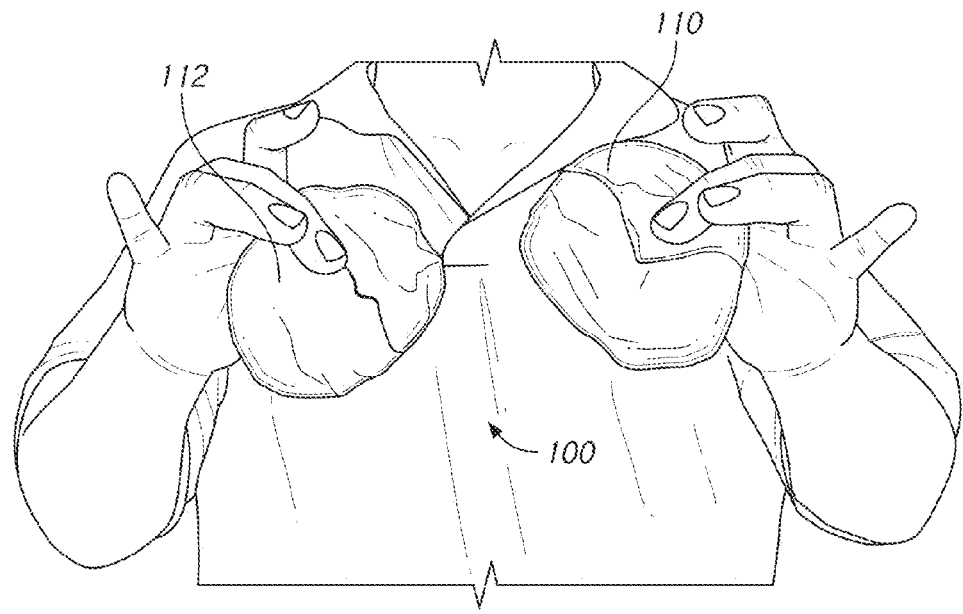
FIGS. 1A-1B are various views of a lettuce leaf-based hamburger bun produced in accordance with an embodiment of the methods disclosed herein.
Figure 1B:
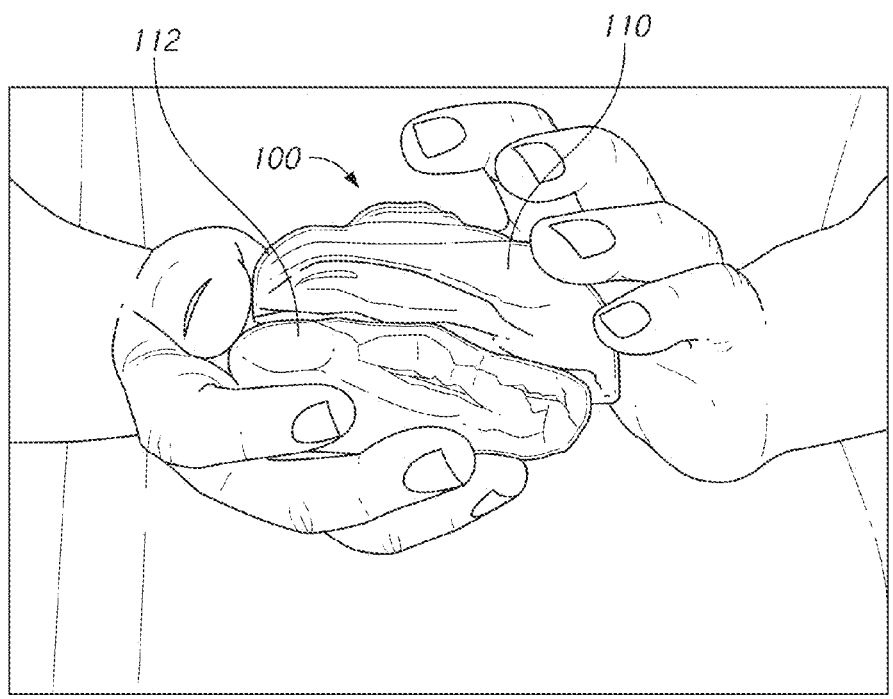

FIGS. 1A-1B illustrate a lettuce leaf-based bun 100 formed according to methods described herein. FIG. 1A illustrates the bun top half 110 (or top portion) and the bun bottom half 112 (or bottom portion) shown separately: the top of the bun top half 110 and the bottom of the bun bottom half 112 are visible. As can be seen, the lettuce leaf-based bun 100 is approximately the same size (e.g., diameter and thickness) as a standard hamburger bun. FIG. 1B illustrates the bun top half 110 and the bun bottom half 112 of the lettuce leaf-based bun 100 in an assembled format. It will be easily understood that a filling, such as a hamburger patty, may be placed between the bun top half 110 and the bun bottom half 112. While FIGS. 1A and 1B are discussed in the context of a bun top half 110 and a bun bottom half 112, it will be readily appreciated that three, four, five or even more layers of buns may be used (e.g., any given piece may be a "middle" bun rather than a top bun or a bottom bun). Such configurations may be useful when constructing a double-decker burger or sandwich, such as McDonalds'® BigMac® sandwich, a club sandwich, etc.

The shape of the top half 110 may be the same or different than the shape of the bottom half 112. For example, the top half 110 may be generally hemispherical (e.g., like the top half of a wheat-based hamburger bun) and the bottom half 110 may be generally cylindrical (e.g., like the bottom half of a wheat-based hamburger bun). For example, each of the top half 110 and the bottom half 110 may be generally cylindrical (e.g., each like the bottom half of a wheat-based hamburger bun or sliced bread).

Several examples of systems and methods disclosed herein are for the production of vegetable product hamburger buns, such as those shown in FIGS. 1A-1B. After consideration of the systems and methods described herein, one of ordinary skill in the art will understand that the systems and methods disclosed herein may be adapted to create any of a number of buns, wraps, rolls, shells, pockets, and other vegetable product food holders.

The systems and methods disclosed herein may be used to produce hamburger buns in an approximately circular shape. Hamburger buns may be approximately circular with a diameter in the range of between about 3-6 inches, between about 3.5-5.5 inches, between about 4-4.5 inches, or any other diameter that may be desired for a hamburger bun. As will be readily understood after review of the following various methods, the thickness of hamburger buns may vary. For example, hamburger buns may have a top half and/or a bottom half (e.g., bun top half 110 and/or bun bottom half 112) that has a thickness of less than about 4 inches, less than about 3.5 inches, less than about 3 inches, less than about 2.5 inches, less than about 2 inches, less than about 1.5 inches, less than about 1 inch, less than about 0.75 inches, less than about 0.5 inches, or any other thickness that may be desirable for each half of the hamburger bun. It will also be understood that other shapes of hamburger buns may be made, such as, but not limited to, square hamburger buns.

The systems and methods disclosed herein may be used to produce slider buns in an approximately circular shape. Slider buns may be approximately circular with a diameter in the range of between about 2-4 inches, between about 2.5-3.5 inches, or any other diameter that may be desired for a slider bun. As will be readily understood after review of the following various methods, the thickness of slider buns may vary. For example, slider buns may have a top half and/or a bottom half (e.g., bun top half 110 and/or bun bottom half 112) that has a thickness of less than about 4 inches, less than about 3.5 inches, less than about 3 inches, less than about 2.5 inches, less than about 2 inches, less than about 1.5 inches, less than about 1 inch, less than about 0.75 inches, less than about 0.5 inches, or any other thickness that may be desirable for each half of the slider bun. It will also be understood that other shapes of slider buns may be made, such as, but not limited to, square slider buns.

The systems and methods disclosed herein may be used to produce hot dog buns in an approximately oblong shape. Hot dog buns may be oblong with a length in the range of between about 4-8 inches, between about 4.5-7.5 inches, between about 5-7 inches, or between about 5.5 and 6.5 inches and a width of between about 1.5-3.5 inches or between about 2-3 inches. Such hot dog buns may have any other length and or width that may be desired for a hot dog bun (e.g., a foot long frank may benefit from a bun having a width of about 2.5-3 inches, but a length of about 9-13 inches). As will be readily understood after review of the various methods disclosed herein, the thickness of hot dog buns produced may vary. For example, hot dog buns may have a top half and/or a bottom half that has a thickness of less than about 4 inches, less than about 3.5 inches, less than about 3 inches, less than about 2.5 inches, less than about 2 inches, less than about 1.5 inches, less than about 1 inch, less than about 0.75 inches, less than about 0.5 inches, or any other thickness that may be desirable for each half of the hot dog bun.

The systems and methods disclosed herein may be used to produce bratwurst buns in an approximately oblong shape. Bratwurst buns may be oblong with a length in the range of between about 4-10 inches, between about 5-9.5 inches, between about 6-9 inches, or between about 7-8.5 inches and a width of between about 2-4.5 inches, between about 2.5-4 inches, or between about 3-3.5 inches. Such bratwurst buns may have any other length and or width that may be desired for a bratwurst bun. As will be readily understood after review of the following various methods, the thickness of bratwurst buns may vary. For example, bratwurst buns may have a top half and/or a bottom half that has a thickness of less than about 4 inches, less than about 3.5 inches, less than about 3 inches, less than about 2.5 inches, less than about 2 inches, less than about 1.5 inches, less than about 1 inch, less than about 0.75 inches, less than about 0.5 inches, or any other thickness that may be desirable for each half of the bratwurst bun.

The systems and methods disclosed herein may be used to produce buns in an approximately oblong shape for submarine sandwiches, hoagie sandwiches, or bahn mi sandwiches (as these different types of sandwiches frequently use similarly sized breads, they will be referred to collectively hereinafter as "sub" sandwiches). Sub sandwich buns may be oblong with a length in the range of between about 6-12 inches, between about 6.5-11.5 inches, between about 7-11 inches, between about 7.5-10.5 inches, between about 8-10 inches, or between about 8.5 and 9.5 inches and a width of between about 2-5 inches, between about 2.5-4.5 inches, or between about 3-4 inches. Such sub sandwich buns may have any other length and or width that may be desired for a sub sandwich bun. As will be readily understood after review of the following various methods, the thickness of sub sandwich buns may vary. For example, sub sandwich buns may have a top half and/or a bottom half that has a thickness of less than about 4 inches, less than about 3.5 inches, less than about 3 inches, less than about 2.5 inches, less than about 2 inches, less than about 1.5 inches, less than about 1 inch, less than about 0.75 inches, less than about 0.5 inches, or any other thickness that may be desirable for each half of the sub sandwich bun.

The instant disclosure may be applicable to many other types of food containers that may be made out of various vegetable products (e.g., leaves or sheets), such as, but not limited to, pita or tortilla-style wraps, pockets, and/or shells.

Molding Systems

Figure 2A:
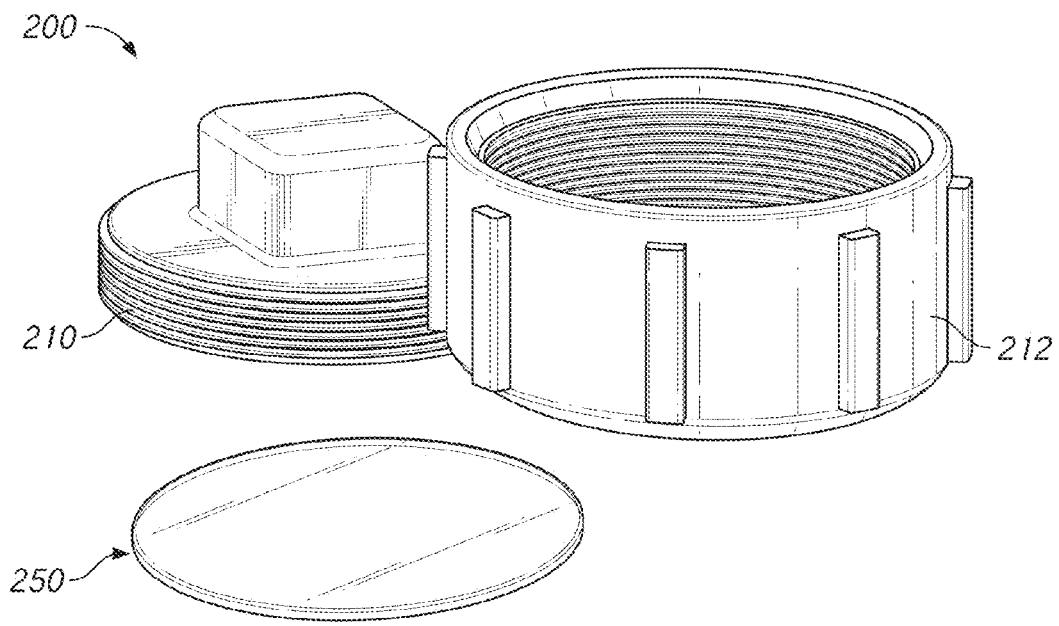
FIGS. 2A-2C are various views of an embodiment of a vegetable product bun mold set, which may be used to produce hamburger buns.
Figure 2B:
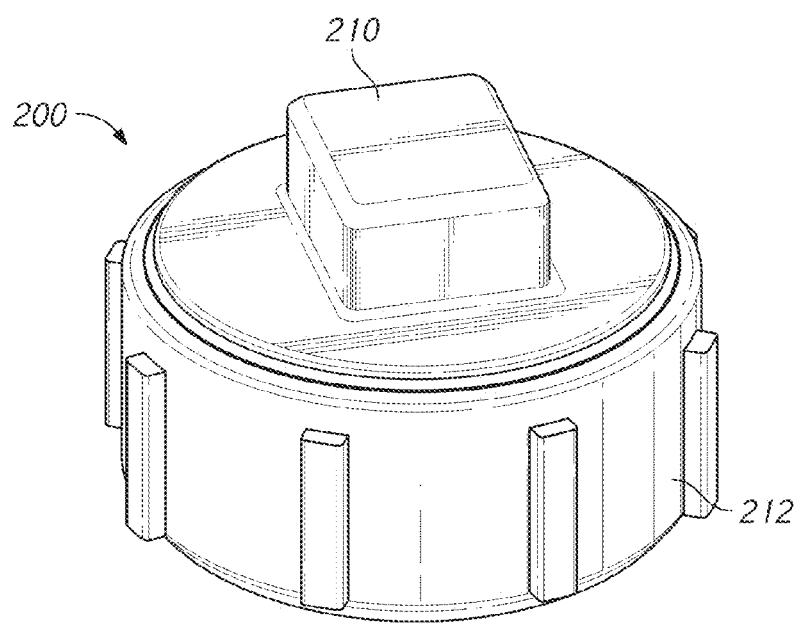
Figure 2C:
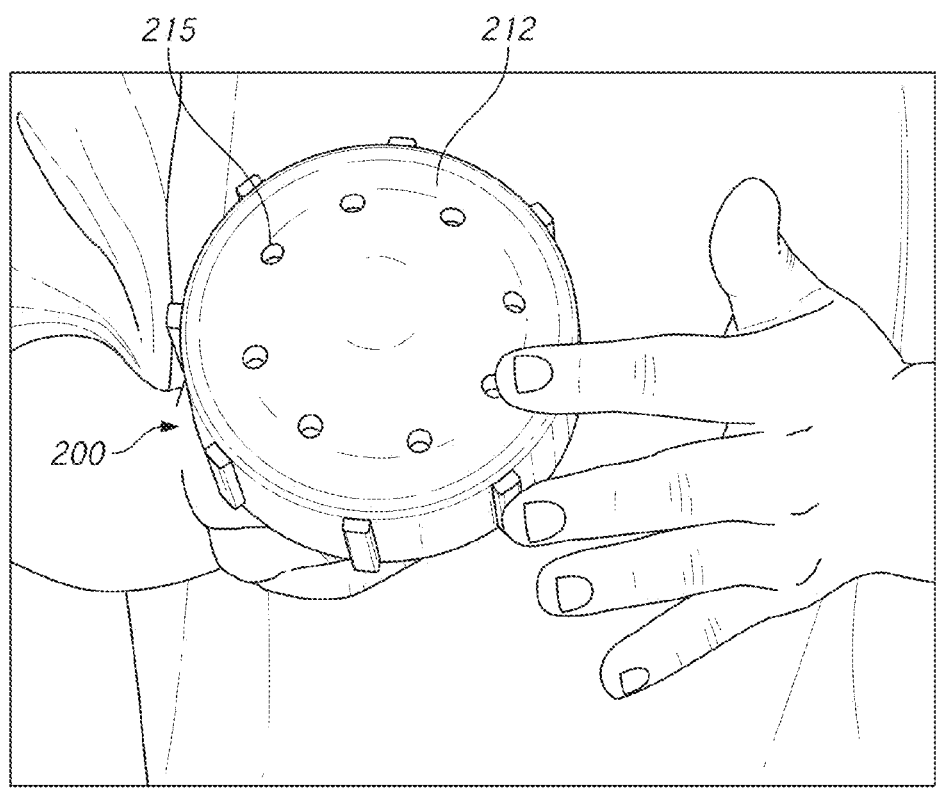

FIGS. 2A-2C illustrate various views of a vegetable product bun mold set 200. The vegetable product bun mold set 200 shown in FIGS. 2A-2C includes a bun mold base 210 (e.g., plug, compression plug, lock, door, etc.), a bun mold top 212, and a bun mold compression disk 250. FIG. 2A shows the bun mold base 210, bun mold top 212, and bun mold compression disk 250 completely disassembled and not in use. FIG. 2B shows the vegetable product bun mold set 200 in is assembled configuration, as when it is actively being used to produce a lettuce leaf-based bun 100, such as discussed herein, e.g., in conjunction with FIGS. 1A-1B. FIG. 2C illustrates a series of bun mold perforation holes 215 on the top surface of the bun mold top 212 of the vegetable product bun mold set 200. As discussed herein, the various portions of the vegetable product bun mold set 200 are used to hold/contain and compress the vegetable product (e.g., lettuce leaves) during the forming of the lettuce leaf-based bun 100.

Various methods of using the vegetable product bun mold set 200 are discussed herein. To provide additional context for the present discussion of the vegetable product bun mold set 200, a simplified/truncated explanation of one method of forming a lettuce leaf-based bun 100 using the vegetable product bun mold set 200 is provided herein. In operation, a vegetable product, such as a lettuce leaf, is prepared (e.g., washed, trimmed, made more flexible, made softer, etc.) and inserted into the bun mold top 212. Then, the vegetable product is folded over and/or onto itself. The bun mold compression disk 250 is then inserted into the bun mold top 212 over the vegetable product. Pressure is then applied to the compression disk 250 to compresses the vegetable product within the bun mold top 212. The compression disk 250 may help to evenly distribute compression forces, which can help the vegetable product take the shape of the inner surface of the bun mold top 212. The compression disk 250 may be omitted and pressure may be applied directly to the vegetable product. Then, the bun mold compression disk 250 may be removed from the vegetable product and taken out of the bun mold top 212.

As discussed herein, a single vegetable product bun mold set 200 may be used to form an entire lettuce leaf-based bun 100, including both the bun top half 110 and the bun bottom half 112 separately or concurrently. A first vegetable product bun mold set 200 may be used to produce only a bun top half 110 and/or a second vegetable product bun mold set 200 may be used to produce only a bun bottom half 112 of the lettuce leaf-based bun 100.

When the vegetable product bun mold set 200 is being used to form both a bun top half 110 and a bun bottom half 112 concurrently, a second layer of a vegetable product, such as a second lettuce leaf is prepared (e.g., washed, trimmed, made more flexible, made softer, etc.) and inserted into the bun mold top 212 over (e.g., on top of) the first lettuce leaf. The second lettuce leaf is then folded over and/or onto itself and compressed by placing the bun mold compression disk 250 in bun mold top 212 and applying pressure. A single application of pressure optionally using the compression disk 250 may be used to help shape the bun top half 110 and a bun bottom half 112. The bun mold compression disk 250 may then be removed from the vegetable product and taken out of the bun mold top 212. Next, the bun mold base 210 may be inserted into the bun mold top 212 to compress the vegetable product bun portions, e.g., the bun top half 110 and the bun bottom half 112. Finally, the entire assembly, including the vegetable product bun mold set 200 (which, may or may not include the bun mold compression disk 250) and the bun top half 110 and bun bottom half 112 of the lettuce leaf-based bun 100 are chilled. After chilling, the bun 100 may be ready for consumption as a food holder, e.g., a hamburger bun.

The vegetable product bun mold set 200 illustrated in FIGS. 2A-2C is round and approximately 4 inches in diameter, has a curved/rounded inner surface (e.g., a hemispherical inner surface), and cylindrical sidewalls. As such, the vegetable product bun mold set 200 shown in FIG. 2A-2C is configured to produce a vegetable product hamburger bun. It will be understood that the vegetable product bun mold set 200 may be configured in any of a number of shapes to produce different types of food holders or buns. For example, instead of being an approximately 4 inch round, the vegetable product bun mold set 200 may be: approximately 2.5 inch round to form a slider bun; approximately 2.5 by 6 inches to form a hot dog bun; approximately 3 by 7 inches to form a bratwurst bun; or approximately 3.5 by 9 inches to forma sub sandwich bun. However, despite the fact that any of these various shapes are encompassed by this disclosure, the vegetable product bun mold set 200 will be discussed and explained using the hamburger bun mold as a representative example.

With reference to FIGS. 2A-2C, the bun mold top 212 may be a container having a rounded top, a cylindrical wall (e.g., a sidewall) having a height, a set of bun mold perforation holes 215 (shown in FIG. 2C), and an internal thread 260. When the vegetable product bun mold set 200 is being used to form either an entire lettuce leaf-based bun 100 (including both a bun top half 110 and a bun bottom half 112) or just a bun top half 110, the rounded top of the bun mold top 212 may generally mirror the desired shape of the top surface of the bun top half 110 of the lettuce leaf-based bun 100. For example, when a bun top half 110 with a high dome is desired, the rounded top of the bun mold top 212 may be more rounded (e.g., hemispherical, or nearly hemispherical). When a bun top half 110 with a low dome or flat top is desired, the rounded top of the bun mold top 212 may be less rounded or nearly flat. It will be understood that any curvature of the rounded bun mold top 212 may be used to produce any mirrored curvature of the bun top half 110 of the lettuce leaf-based bun 100. In addition, the inner surface of the bun mold top 212 may comprise textures or surface features that may be imparted to the vegetable product by/during compression. For example, stitching and/or texture of a baseball, basketball, soccer ball, or other balls, faces, logos, etc. may be embossed on at least a top layer of the lettuce leaf-based bun 100. When the vegetable product bun mold set 200 is being used to form just a bun bottom half 112, the bun mold top 212 may have a nearly flat top surface.

FIG. 2C illustrates the rounded top of the bun mold top 212 shown in FIGS. 2A-2B. The rounded top of the bun mold top 212 comprises 8 bun mold perforation holes 215. The purpose, function, and various details regarding these bun mold perforation holes 215 is discussed herein in more detail in connection with the various methods of forming vegetable product food holders (e.g., in connection with FIGS. 6A-6D, 7A-7D, 9A-9B, and 10A-10F). The bun mold top 212 may comprise more or less than 8 bun mold perforation holes 215. The various bun mold perforation holes 215 may have larger or smaller diameters than what is shown in FIG. 2C. The various bun mold perforation holes 215 may have different diameters from each other (e.g., not all bun mold perforation holes 215 on a bun mold top 212 have an equal diameter). The various bun mold perforation holes 215 may have different spatial configurations. The bun mold perforation holes 215 may be configured to accommodate one perforation pin or a plurality of perforation pins. The bun mold perforation holes 215 may be shapes other than circular (e.g., an arcuate, oblong, oval, dart/arrow, and/or peanut shape).

The bun mold base 210 is configured to fit inside and mate with the bun mold top 212 such that the bun mold base 210 may hold the vegetable product (e.g., lettuce leaves) inside the bun mold top 212 during one or more steps of forming the lettuce leaf-based bun 100. As shown in FIG. 2A, the bun mold base 210 has an external thread external thread 262 and the bun mold top 212 has a complementary internal thread 260. The external thread 262 of the bun mold base 210 is configured to mate with the internal thread 260 of the bun mold top 212. In that way, the bun mold base 210 may be adjustably inserted into the bun mold top 212 and thereby compress (e.g., generate compressive forces on) the contents thereof (e.g., vegetable product). For example, if more pressure is desired, the bun mold base 210 may be rotated by an amount (e.g., ¼ of a turn, ½ a turn ¾ of a turn, 1 turn, 2, 3, 4 turns, or any other number or fractions of a turn as may be useful) such that external thread 262 of the bun mold base 210 advances along the internal thread 260 of the bun mold top 212, thereby linearly advancing the bun mold base 210 into the open cylinder of the bun mold top 212. In this way, the volume inside the bun mold top 212 decreases and the contents are compressed.

While the vegetable product bun mold set 200 illustrated in FIGS. 2A-2C shows a bun mold base 210 that mates with the bun mold top 212 using threads, it will be understood that any of a number of mating and/or locking mechanisms may be used, including both mating and/or locking mechanisms that allow adjustable insertion of the bun mold base 210 into the bun mold top 212 and mating and/or locking mechanisms that allow only fixed-depth insertion of the bun mold base 210 into the bun mold top 212. A bun mold base 210 that is adjustably insertable into the bun mold base 210 advantageously can provide varying thicknesses of bun top half 110 and/or bun bottom half 112 (as the case may be) to be formed using a single mold. A bun mold base 210 that is not adjustably insertable, e.g., allows only fixed-depth insertion of the bun mold base 210 into the bun mold top 212, advantageously can facilitate simple formation of reproducible thicknesses of bun top half 110 and/or bun bottom half 112. Methods of facilitating reproducibility using adjustable systems are well within the scope of this disclosure. For example, counting the number of turns a threaded bun mold base 210 is threaded into the a threaded bun mold top 212, looking for tread alignment markers, turning the bun mold base until achieving a certain thickness above or depth into the bun mold top 212 and/or overall mold thickness, combinations thereof, and the like may allow reproducibility (e.g., reproducible thicknesses of buns may be produced by threading the bun mold base 210 into the bun mold top 212 by a set number of turns, e.g., three turns, for every lettuce leaf-based bun 100 made).

Other types of mating and/or locking relationships may be used. For example, "J" or "L" hooks may be used. For another example, a friction fit may be used. For yet another example, a coarse ramp interface may be used (e.g., a very thick, less than 1 or 2 turns thread). For still another example, a removable piston may be used. Ultimately, any structure configured to maintain the vegetable product contents of the bun mold top 212 under compression during subsequent formation steps may be suitable for at least some of the systems and methods for forming vegetable product food holders described herein.

When the vegetable product bun mold set 200 has a bun mold base 210 that is adjustably insertable into the bun mold top 212, the insertion depth of the bun mold base 210 (e.g., into the bun mold top 212) and the height of the cylindrical wall may combine to determine the height of the bun top half 110 and/or bun bottom half 112 that may be produced. When the vegetable product bun mold set 200 has a bun mold base 210 that has only a fixed-depth insertion into the bun mold top 212, the height of the cylindrical wall may determines the height of the bun top half 110 and/or the bun bottom half 112 that may be produced. Depending on the adjustability of the bun mold base 210 (e.g., whether the bun mold base 210 may be adjustable inserted into the bun mold top 212 to various depths or whether the bun mold base 210 may be inserted into the bun mold top 212 to a fixed depth) and the height of the bun top half 110 and/or the bun bottom half 112 desired, different heights of cylindrical walls may be used. The height of the cylindrical wall may be in the range of about 1-6 inches, about 2-5 inches, about 3-4 inches, or any other height that may be useful to forming vegetable product food holders, according to any method disclosed herein.

As shown in FIG. 2A, the bun mold compression disk 250 may be a round disk that is shaped to be removably inserted into the bun mold top 212 to at least temporarily compress the bun top half 110 and/or the bun bottom half 112 into the desired bun shape. Additional description of the bun mold compression disk 250 are discussed herein, in connection with the various methods of forming vegetable product food holders.

Perforator Jig Systems

Figure 3A:
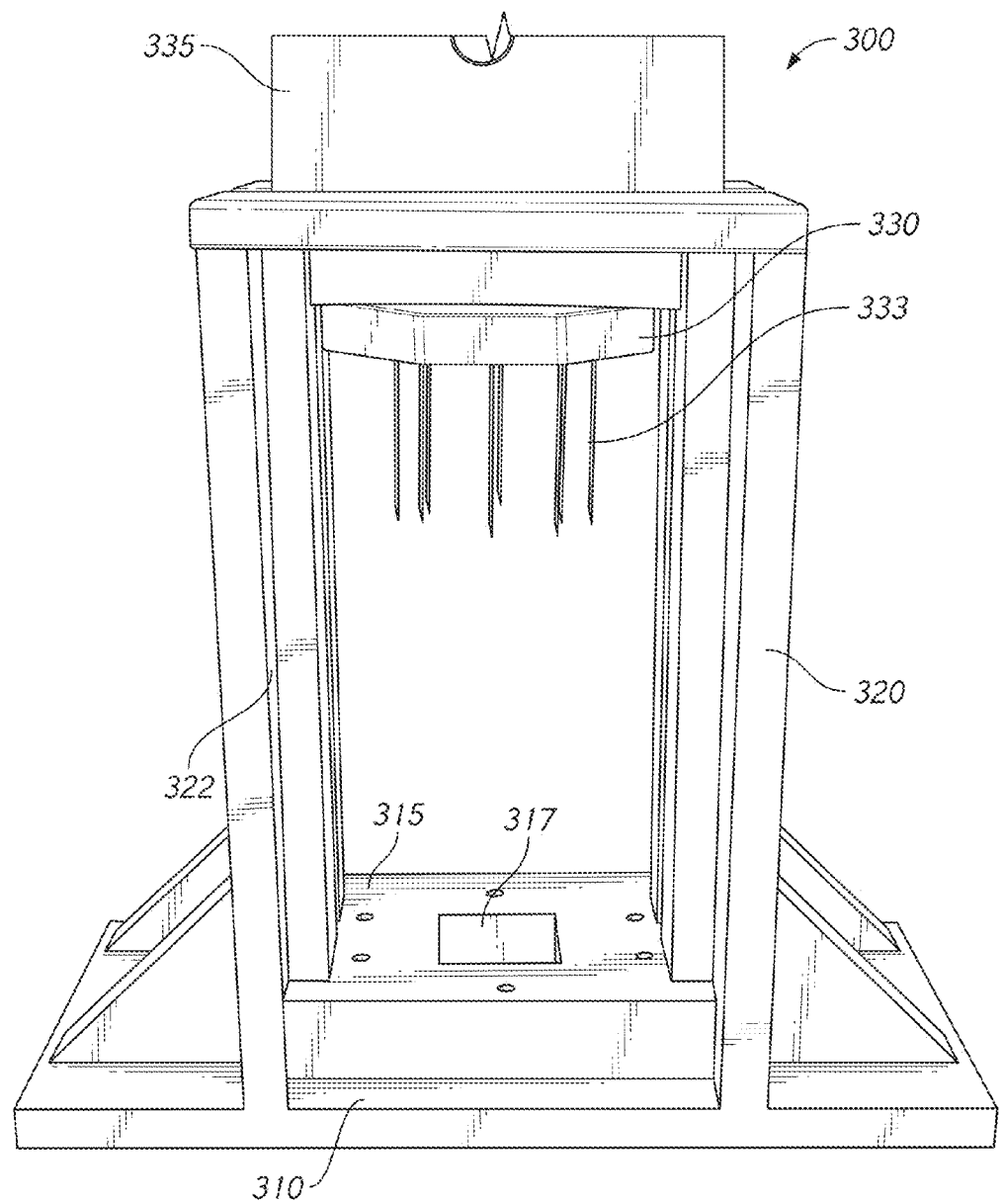
FIG. 3A-3B are various views of an embodiment of a vegetable product bun perforator jig.
Figure 3B:
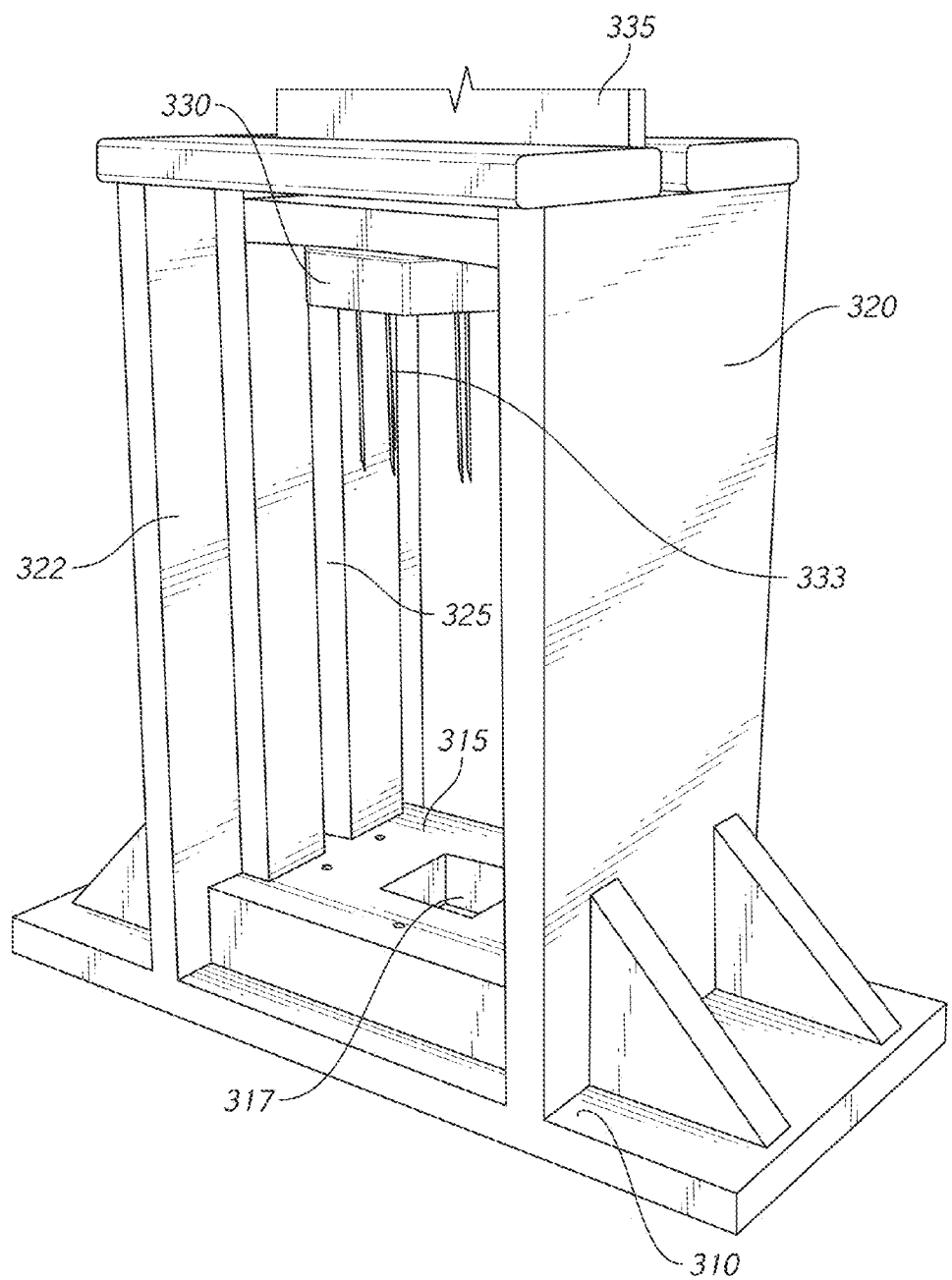

FIGS. 3A-3B illustrate a vegetable product bun perforator jig 300 that may be used to produce vegetable product food holders in conjunction with various molds, such as the vegetable product bun mold set 200 of FIGS. 2A-2C. One function of the vegetable product bun perforator jig 300 may be to hold the vegetable product bun mold set 200 and allow translation of the perforator disk 330 and the perforator prongs 333 (e.g., tines, needles, pins, spears, etc.) towards the bun mold support 315 so that the perforator prongs 333 can enter the bun mold perforation holes 215 of the bun mold top 212.

Figure 9A:
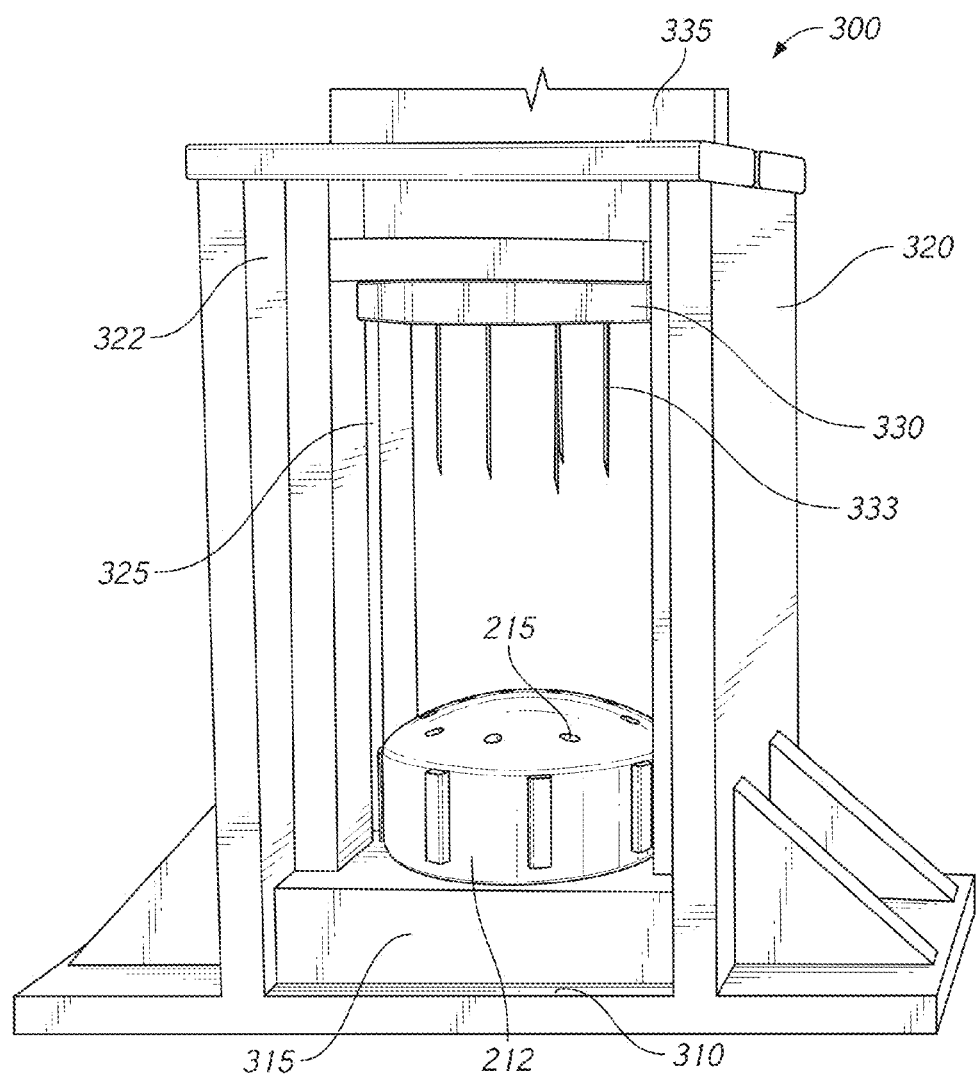
FIGS. 9A-9B show various steps in the method for producing vegetable product food holders of FIG. 4.
Figure 9B:
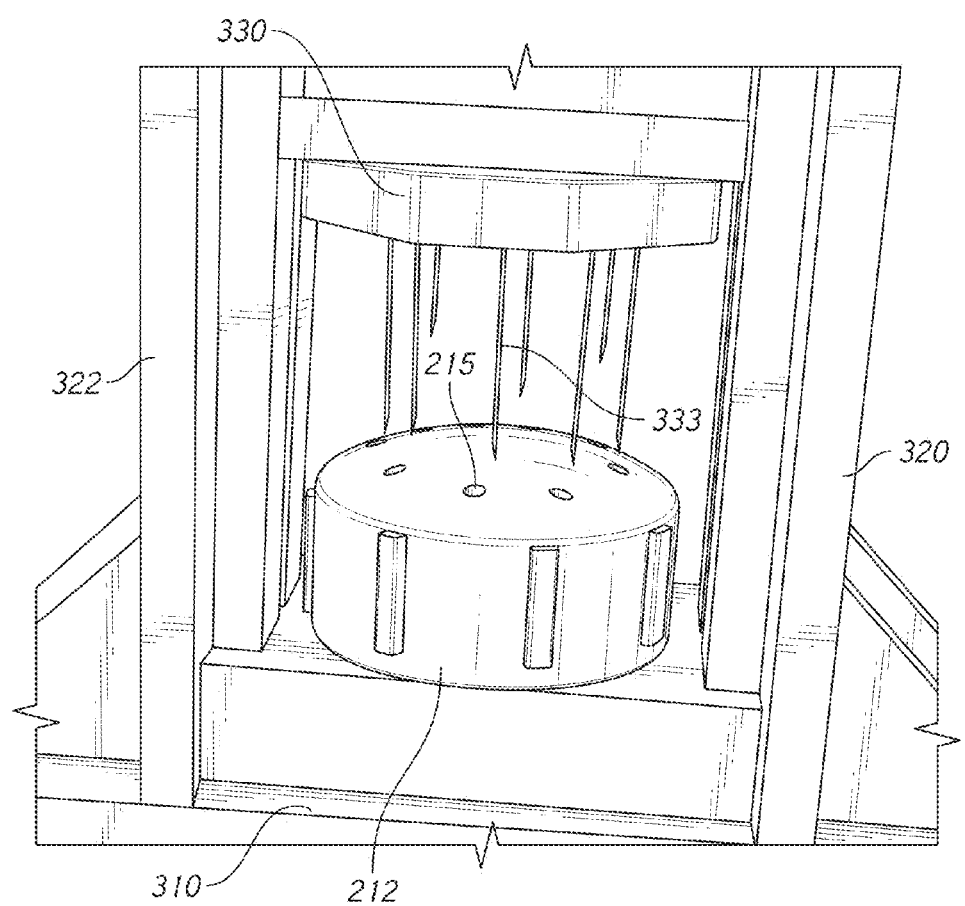

The vegetable product bun perforator jig 300 may have a jig base 310 which can be configured to support the rest of the components of the vegetable product bun perforator jig 300. For example, the jig base 310 may serve as a stable foundation or attachment point for various other components of the vegetable product bun perforator jig 300. The jig base 310 may hold a bun mold support 315, which may incorporate, include, or couple to a bun mold centering socket 317. The bun mold centering socket 317 may be configured to accept and hold the vegetable product bun mold set 200 in a given position (an example of which is shown in FIGS. 9A-9B). As illustrated in FIGS. 2A-2B and 3A-3B, the bun mold base 210 of the vegetable product bun mold set 200 may have a projection extending approximately perpendicularly from the bottom, e.g., a square projection. The bun mold centering socket 317 may be configured to accept the projection of the bun mold base 210 and hold it in a fixed position (in at least one dimension), e.g., prevent it from rotating. Of course, any of a number of varying configurations of bun mold centering sockets 317 or other types of fixtures may be used to hold the vegetable product bun mold set 200 in place while the vegetable product bun perforator jig 300 is in use. In addition, the bun mold support 315 and/or bun mold centering socket 317 may be of or have a different size or shape (or be interchangeable, such that different bun mold centering sockets 317 may couple to the bun mold support 315 of the vegetable product bun perforator jig 300) to accommodate various sizes and shapes of vegetable product bun mold sets 200, such as those discussed herein (e.g., for forming hot dog buns, sub sandwich buns, slider buns, etc.).

The vegetable product bun perforator jig 300 may include a structure to allow translation of the perforator disk 330 and perforator extension arm 335 (and, by extension, the perforator prongs 333, which may be attached to the perforator disk 330) along a path, e.g., a fixed path, toward the bun mold support 315 (and any vegetable product bun mold set 200 that may be in place on the bun mold support 315 and/or bun mold centering socket 317). The vegetable product bun perforator jig 300 may have various configurations of support arms. For example, the vegetable product bun perforator jig 300 may include a first support 320 and a second support 322 (e.g., the vegetable product bun perforator jig 300 may have a dual arm support for the perforator disk 330 and perforator extension arm 335). In another example, the vegetable product bun perforator jig 300 may have only a single support arm (e.g., only a first support 320 (or only a second support 322)). The support structures, such as the first support 320 and/or second support 322 may be configured to hold the perforator disk 330 and perforator extension arm 335 and allow at least the perforator disk 330 to travel along a path (e.g., a path toward the bun mold support 315 and/or bun mold centering socket 317 and any vegetable product bun mold set 200 that may be present).

As illustrated in FIG. 3B, the second support 322 may include a guidance track 325 that is configured to guide the perforator extension arm 335 as it travels along the path toward the bun mold support 315 and/or the bun mold centering socket 317. While only a single guidance track 325 is shown, it will be understood that either the second support 322 and/or the guidance track 325 may include a guidance track 325. The guidance track 325 shown in FIG. 3B is a rectangular track configured to accept the rectangular edge of the perforator extension arm 335 and guide it along the path of the rectangular track. However, it will be understood that any of a number of different guidance tracks may be used, incorporating different shapes, locking mechanisms, friction reducing elements, automation elements, motors, ratchets, etc. Indeed, any structure configured to guide the perforator disk 330 and/or the perforator extension arm 335 to and from the bun mold support 315 and/or the bun mold centering socket 317 (and any vegetable product bun mold set 200 and may be present) may be suitable for at least some of the systems and methods for forming vegetable product food holders described herein.

The perforator disk 330 may be attached to the perforator extension arm 335 and may hold the perforator prongs 333. The perforator extension arm 335 may be extended/translated along the path in any of a number of ways. For example, the perforator extension arm 335 may be manually operable, as is shown in FIGS. 3A-3B. For example, the perforator extension arm 335 may be automatically operable and/or motorized. For example, the vegetable product bun perforator jig 300 may include a sensor that senses the presence of a vegetable product bun mold set 200 (e.g., when the vegetable product bun mold set 200 is in place on the bun mold support 315 and/or the bun mold centering socket 317). The sensor may signal a motor connected to the perforator extension arm 335 to translate the perforator disk 330 and perforator extension arm 335 towards the vegetable product bun mold set 200. The sensor may also advantageously prevent the perforator extension arm 335 and the perforator disk 330 from moving when no vegetable product bun mold set 200 is sensed on the bun mold support 315 or the bun mold centering socket 317 (such systems may improve user safety as the sharp perforator prongs 333 could not descend and harm a user maintaining the vegetable product bun perforator jig 300 if a vegetable product bun mold set 200 is not present). Many other modifications to the vegetable product bun perforator jig 300, including safety modifications are within the scope of this disclosure.

The perforator disk 330 may hold a number of perforator prongs 333. The perforator disk 330 and the bun mold centering socket 317, when present, are configured to align the bun mold top 212 of the vegetable product bun mold set 200 with the perforator prongs 333. For example, the perforator prongs 333 may be held rotationally static/fixed with respect to the rest of the vegetable product bun perforator jig 300 but may be vertically translatable. In much the same way, as shown in FIGS. 9A-9B, the square projection on the bun mold centering socket 317 may be configured to hold the vegetable product bun mold set 200 rotationally fixed with respect to the vegetable product bun perforator jig 300 and the perforator prongs 333. In this way, the perforator prongs 333 may be automatically aligned and held in fixed alignment with the bun mold perforation holes 215 of the bun mold top 212 so that the perforator prongs 333 may enter the bun mold perforation holes 215 when translated (e.g., using the perforator disk 330 and perforator extension arm 335) toward the vegetable product bun mold set 200.

The vegetable product bun perforator jig 300 shown in FIGS. 3A-3B includes a perforator disk 330 that holds eight perforator prongs 333, which may be the same number of perforator prongs 333 as there are bun mold perforation holes 215 in the bun mold top 212 of the vegetable product bun mold set 200. The perforator disk 330 may hold a varying number of perforator prongs 333. For example, the perforator disk 330 may hold the same number of perforator prongs 333 as the bun mold top 212 has bun mold perforation holes 215. For example, the perforator disk 330 may hold more perforator prongs 333 than there are bun mold perforation holes 215 in the bun mold top 212 of the vegetable product bun mold set 200. For example, the perforator disk 330 may hold fewer perforator prongs 333 than there are bun mold perforation holes 215 in the bun mold top 212 of the vegetable product bun mold set 200. For example, the perforator disk 330 may hold between about 1-200 perforator prongs 333, between about 2-180 perforator prongs 333, between about 3-160 perforator prongs 333, between about 4-140 perforator prongs 333, between about 5-120 perforator prongs 333, between about 6-100 perforator prongs 333, between about 7-80 perforator prongs 333, between about 8-60 perforator prongs 333, between about 9-40 perforator prongs 333, between about 10-20 perforator prongs 333, or any other number of perforator prongs 333 that may be useful to form a vegetable product food holder in accordance with any of the various methods disclosed herein.

As shown in FIGS. 3A-3B and 9A-9B, the perforator prongs 333 may be fixedly attached to the perforator disk 330. As discussed herein, it may be advantageous for the perforator disk 330 to hold the same number of perforator prongs 333 as the number of bun mold perforation holes 215 included in the bun mold top 212 of the vegetable product bun mold set 200. The perforator prongs 333 may be attached to the perforator disk 330 in any of a number of ways. For example, the perforator prongs 333 may be retractably coupled to the perforator disk 330 so that when subjected to a threshold amount of force, the perforator prongs 333 retract into the perforator disk 330. The perforator disk 330 may include an array of retractable perforator prongs 333, e.g., including tens, twenties, fifties, or even hundreds (200, 300, 400, 500 or more) of perforator prongs 333. An array of retractable perforator prongs 333 may allow the vegetable product bun perforator jig 300 to accommodate a variety of different vegetable product bun mold sets 200 having different sizes and different numbers of bun mold perforation holes 215 in the bun mold top 212. When in use, the perforator extension arm 335 and perforator disk 330 holding the array of retractable perforator prongs 333 may be translated toward a vegetable product bun mold set 200 having any shape. The perforator prongs 333 that are not aligned with the bun mold perforation holes 215 in the bun mold top 212 may retract (so that they are not damaged). The perforator prongs 333 that are aligned with the bun mold perforation holes 215 in the bun mold top 212 may extend into the bun mold perforation holes 215 of the bun mold top 212.

The vegetable product bun perforator jig 300 is an example structure that may be used to carry out one or more of the methods disclosed herein. It will be understood that many other structures and/or solutions exist. For example, a handheld puck holding a plurality of perforator prongs 333 may be used—e.g., the handheld puck may be manually aligned with a vegetable product bun mold set 200 so that perforator prongs 333 coupled to the handheld puck align with the bun mold perforation holes 215 of the bun mold top 212. For example, individual perforator prongs 333 may be used—e.g., a single perforator prong 333 may be used to enter each individual hole of the bun mold perforation holes 215.

Method of Making Vegetable Product Food Holders

Figure 4:
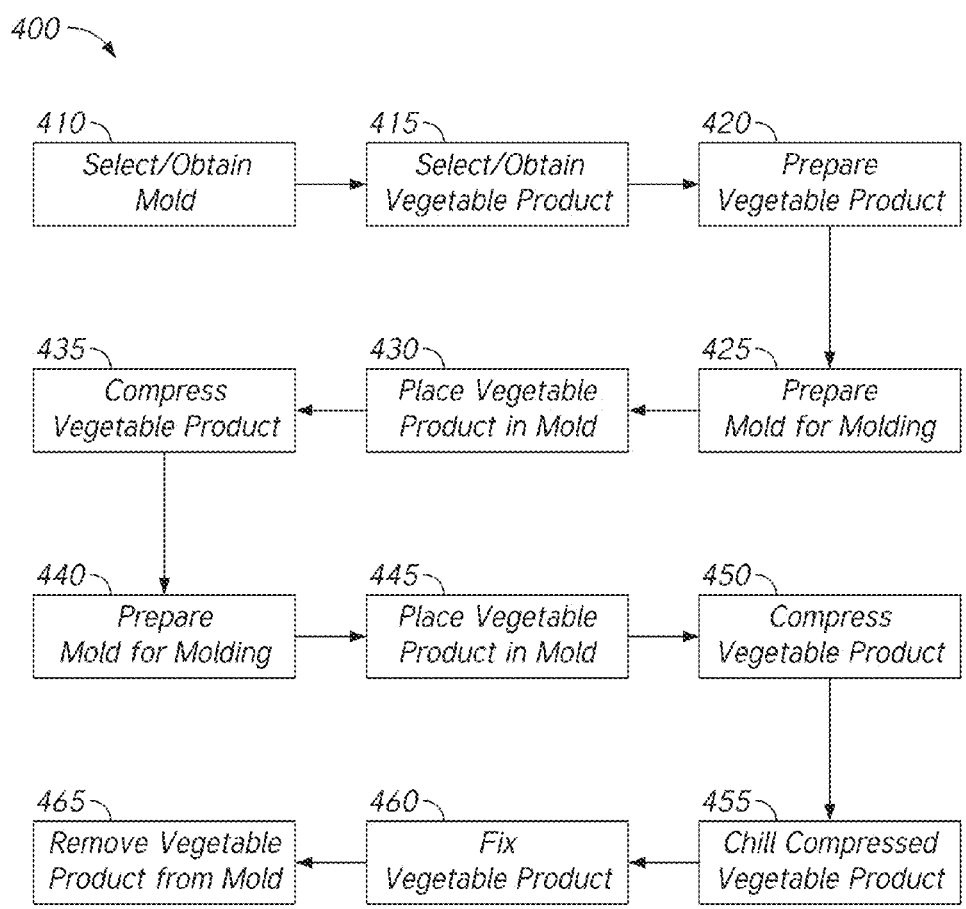
FIG. 4 is a flow chart of one embodiment of a method for producing vegetable product food holders.

FIG. 4 illustrates a flow chart of a method for producing vegetable product food holders 400. FIG. 4 will be described in conjunction with several of the subsequent figures, including, but not limited to, FIGS. 5A-5L, 6A-6D, 7A-7D, 8A-8B, 9A-9B, and 10A-10F.

At step one 410, a mold, e.g., a vegetable product bun mold set 200, may optionally be selected for producing a vegetable product food holder (e.g., step one 410 may be omitted from the method for producing vegetable product food holders 400). For example, if the operator desires to produce a hamburger bun, a hamburger bun-shaped vegetable product bun mold set 200 (such as one of those described herein, and shown in FIGS. 2A-2C) may be selected. If the operator intends to produce a hot dog bun, a hot dog bun-shaped vegetable product bun mold set 200 (such as one of those described herein) may be selected. Any other shape of mold may be used, including, but not limited to, any of those described herein, such as hamburger, slider, hot dog, bratwurst, sub sandwich, pita, pocket, tortilla, wrap, rolls, shells, and other vegetable product food holders.

At step two 415, the operator may optionally select a vegetable product (e.g., step two 415 may be omitted form the method for producing vegetable product food holders 400). For example, iceberg lettuce may advantageously be used—iceberg lettuce has good balance of vegetable product features/characteristics that augment and/or facilitate at least one method described herein, including, but not limited to, leaf dimensions (e.g., width, length, and thickness), flexibility, crispness, flavor, color, longevity and storability, and fibrosity, among many others. For example, many other types of leaf vegetables may be used, including, but not limited to: green romaine lettuce, butterhead lettuce, bibb lettuce (including, but not limited to, blushed butter oak, buttercrunch, carmona, divina, emerald oak, flashy butter oak, kweik, pirat, sanguine ameliore, summer bib, tom thumb, victoria, and yugoslavian red lettuce), red romaine lettuce, green leaf lettuce, red leaf lettuce, boston lettuce, spinach, swiss chard, red oak, green oak, parella, lolla rosa, arugula, tango, escarole, tot soi, arugula, mizuma, radicchio, frisee, dandelions; green cabbage, red cabbage, bunching lettuces (including, but not limited to, austrian greenleaf, bijou, black seeded simpson, bronze leaf, brunia, cracoviensis, fine frilled, gold rush, green ice, new red fire, oakleaf, perilla green, perilla red, merlot, merveille de mai, red sails, ruby, salad bowl, and simpson elite lettuce), savoy cabbage; purple cabbage, tuscan cabbage, cavalo nero, amaranth, salad rocket, danish cabbage, pointed cabbage, domestic cabbage, beet greens, bitterleaf, chinese cabbage, broccoli rabe, brussel spout leaves, flatweed, cauliflower leaves, grape leaves, celery leaves, celtuce, ceylon spinach, cos lettuce (including, but not limited to, brown golding, chaos mix ii black, chaos mix ii white, devil's tongue, dark green romaine, de morges braun, hyper red rumple, little leprechaun, mixed chaos black, mixed chaos white, nova f3, nova f4 black, nova f4 white, paris island cos, valmaine, and winter density lettuce), chard, chaya, chickweed, chicory, looseleaf lettuce, chinese cabbage, chinese mallow, *chrysanthemum* leaves, collard greens, corn salad, cress, endive (including belgian endives), epazote, fat hen, fiddlehead fern, fluted pumpkin, pumpkin leaves, garden rocket, golden samphire, *chenopodium* bonus-henricus, plantain leaves, kai-lan, kale, komatsuna, kuka, lagos bologi, lamb's lettuce, land cress, lizard's tail, mache, melokhia, miner's lettuce, mizuna greens, mustard, napa cabbage, new zealand spinach, orache, pak choy, bok choy, choy sum, gai choy, dai gai choy, michihili, wong bok, paracress, pea leaves, poke, samphire, sea beet, sea kale, any of the various types of sea weeds, sierra leone bologi, soko, sorrel, summer purslane, tatsoi, turnip greens, water spinach, watercress, winter purslane, yarrow, summer crisp lettuces (including, but not limited to, french crisp, batavian, jack ice, oscarde, reine des glaces, anuenue, loma, magenta, nevada and roger lettuce), crisphead lettuce (including, but not limited to, ballade, crispino, ithaca, legacy, mission, salinas, summertime and sun devil lettuce) or any combination or mixtures thereof. For example, fine or thin sheets of other types of vegetables may be used, including, but not limited to, shavings or sheets of cucumber, zucchini, pumpkin, watermelon rind, green *papaya*, squash, potato, sweet potato, carrot, turnip, beet, kohlrabi, gourds, eggplants, peppers, radish, daikon, bamboo shoots, cassava, jicama, parsnip, rutabaga, taro, and/or yams or any combination or mixtures thereof. For example, any type of leaf or leafy vegetable may be combined with any type of shavings or thin sheets of other types of vegetables: representative examples of leaf or leafy vegetables and representative examples of types of shaving or think sheets of other types of vegetables are disclosed herein.

At step three 420, the vegetable product selected at step two 415 (if step two 415 was performed) may optionally be prepared (e.g., step three 420 may be omitted from the method for producing vegetable product food holders 400). For example, the vegetable product may be prepared in accordance with standard food preparation techniques, including washing to remove dirt, insects, and/or any other undesirable particulate. For example, the vegetable product may be allowed to dry. For example, no preparation of the vegetable product may be done other than washing. For example, various other types of preparation may be done, including, but not limited to, toasting, tenderization/softening or otherwise increasing the vegetable product's flexibility, flavoring, etc. For example, the vegetable product may be separated into separate leaves, sheets, shavings, etc. prior to placement in the vegetable product bun mold set 200: separation may allow a lighter, more pleasing bun to be produced by at least one of the methods disclosed herein. For example, the vegetable product may be lightly toasted to bring out flavors.

The vegetable product may be tenderized or softened as part of the preparation. The vegetable product may be tenderized or softened by changing the temperature of the leaf (e.g., application of heat, cooling, or any combination of cooling and heating), steaming, blanching, microwaving, wilting, partial drying, or combinations thereof, or other methods. Softened vegetable product (e.g., plant leaves) may be more resistant to breakage or cracking (e.g., in the case of cabbage, a steamed or blanched cabbage leaf may be more easily formed to a mold without cracking).

Figure 10A:
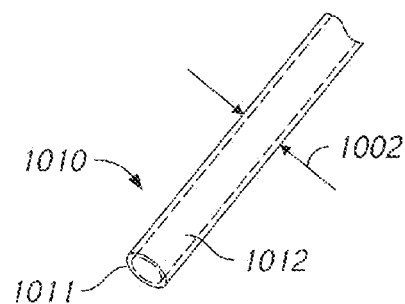
FIGS. 10A-10F are various embodiments of prong tips that may be used in conjunction with the vegetable product bun perforator jig of FIGS. 3A-3B.
Figure 10B:
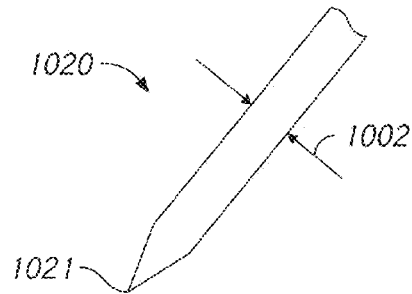
Figure 10C:
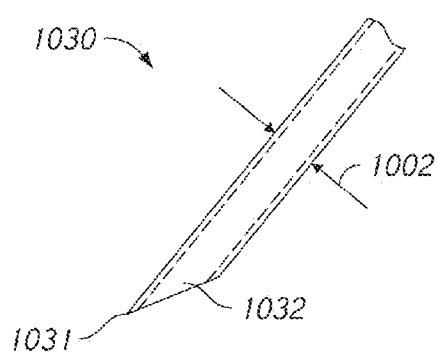
Figure 10D:
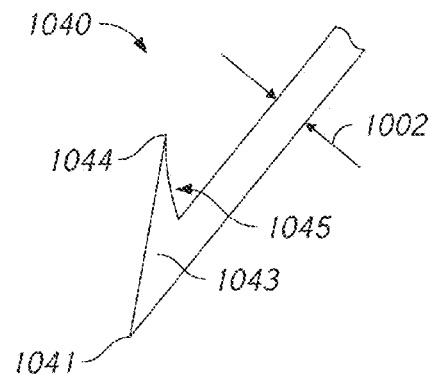
Figure 10E:
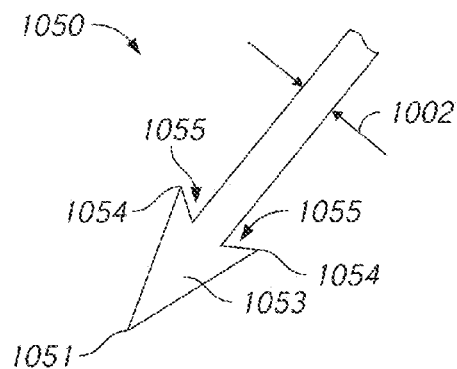
Figure 10F:
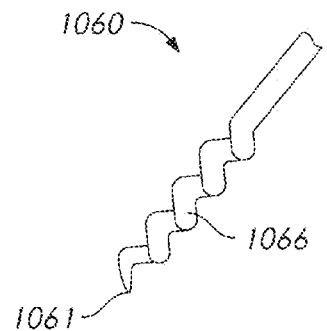

The flexibility of the vegetable product may be altered, e.g., decreased or increased, e.g., the flexibility of the vegetable product may be increased by perforating the vegetable product. For example, vegetable product may be perforated by driving an array of prongs, or needles through the vegetable product (e.g., a leaf). Depending on the type of vegetable product being used, the number, size, and/or shape of the prongs or needles used to perforate the vegetable product may be changed. For example, the density of prongs or needles used to perforate the vegetable product is less than about 5 per $in^2$, less than about 10 per $in^2$, less than about 15 per $in^2$, less than about 20 per $in^2$, less than about 30 per $in^2$, less than about 40 per $in^2$, less than about 50 per $in^2$, less than about 60 per $in^2$, less than about 70 per $in^2$, less than about 80 per $in^2$, less than about 90 per $in^2$, less than about 100 per $in^2$, less than about 120 per $in^2$, less than about 140 per $in^2$, less than about 160 per $in^2$, less than about 180 per $in^2$, less than about 200 per $in^2$, or any other density of needles or prongs sufficient to alter the flexibility of the vegetable product being perforated. For example, the diameter of the prongs or needles used to perforate the vegetable product may be less than about 0.12 inches, less than about 0.11 inches, less than about 0.10 inches, less than about 0.09 inches, less than about 0.08 inches, less than about 0.07 inches, less than about 0.06 inches, less than about 0.05 inches, less than about 0.04 inches, less than about 0.03 inches, less than about 0.02 inches, or any other diameter that may be sufficient to alter the flexibility of the vegetable product being perforated. For example, the needles or prongs may be pin-shaped, solid needles with a sharp point. For example, the needles or prongs may be hollow and "core" the vegetable product being perforated, removing a portion of the vegetable product. For example, various tip shapes may be used, including, but not limited to, those shown in FIG. 10A-10F, including a cylindrical needle prong 1010 as shown in FIG. 10A, a pin prong 1020 as shown in FIG. 10B, a diagonal needle prong 1030 as shown in FIG. 10C, a hook prong 1040 as shown in FIG. 10D, an arrow prong 1050 as shown in FIG. 10E, or a corkscrew prong 1060 as shown in FIG. 10F. Of course, it will be understood that any combination of preparation steps may be used. Moreover, any combination of the disclosed characteristics of preparation tools, e.g., needles or prongs, may be used. For example, a higher density (e.g., higher number of needles per $in^2$) of finer (e.g., comparatively smaller diameter) needles may be used to perforate a vegetable product, such as a leaf. In another example, a higher density of needles may be undesirable when the needles or prongs have a larger diameter. Thus, a comparatively lower density of larger diameter needles may be used to perforate a vegetable product, such as a leaf.

The vegetable product may have flavoring or adhesives applied as part of the preparation process. For example, when multiple smaller pieces of vegetable product are used (e.g., multiple smaller leaves used instead of a smaller number (e.g., 1 or 2) of larger leaves) an edible adhesive may be used to help hold the vegetable product together, including, but not limited to, gelatins, sugars, egg whites, gums, and pastes.

Figure 5A:
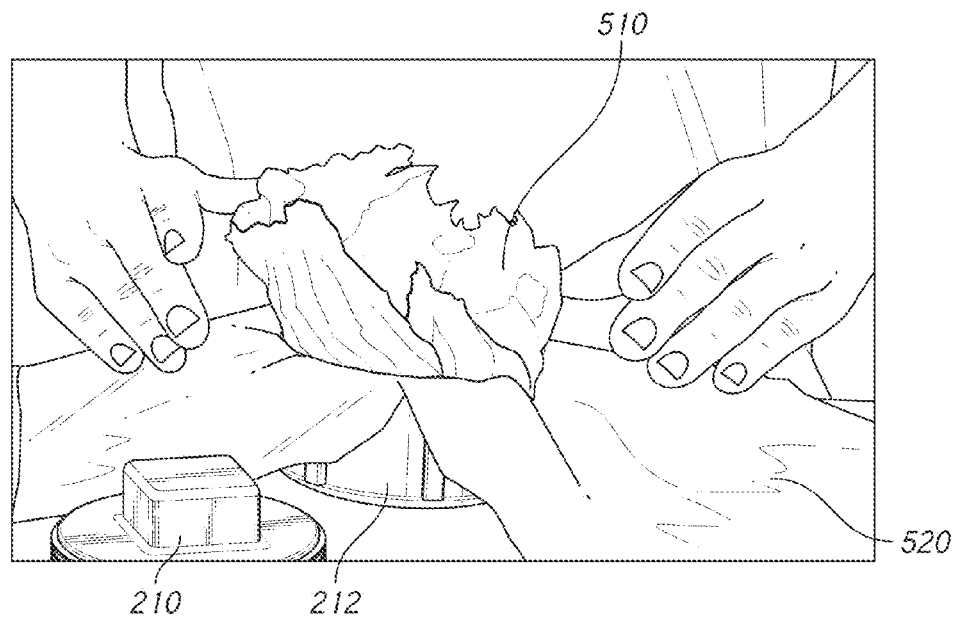
FIGS. 5A-5L show various steps in the method for producing vegetable product food holders of FIG. 4.

At step four 425, the vegetable product bun mold set 200 may optionally be prepared to accept the vegetable product, e.g., one or more leaves. It is generally desirable that the finished vegetable product food holder, e.g., bun, may be removed easily from the vegetable product bun mold set 200 after forming the vegetable product food holder. Preparation of the vegetable product bun mold set 200 may facilitate removal of the vegetable product food holder from the vegetable product bun mold set 200. For example, the vegetable product bun mold set 200 may be lubricated or greased or another substance or coating may be applied to ease insertion and subsequent removal of the vegetable product. For example, the vegetable product bun mold set 200 may be lined with a thin sheet of plastic, such as a food grade plastic wrap (e.g., Saran® wrap). FIG. 5A shows barrier material 520 (e.g., a sheet of plastic wrap) underlying a portion of vegetable product 510 (e.g., a piece of lettuce). Plastic wrap, and/or another form of lubrication, may advantageously allow the vegetable product 510 to be placed in the mold (e.g., the bun mold top 212) easily, pushed into the mold (e.g., the bun mold top 212) easily, compressed within the mold (e.g., the bun mold top 212) easily, and removed from the mold (e.g., the bun mold top 212) easily. Plastic wrap, and like barrier materials, may advantageously prevent the ultimately produced lettuce leaf-based bun 100 from finishing with a substance coating its exterior surface (which would ideally be both non-toxic and edible). Lubricants may be undesirable because they may coat the lettuce leaf-based bun 100 in a material that leaves a sticky or greasy finish, not conducive or comfortable to hold.

Figure 5B:
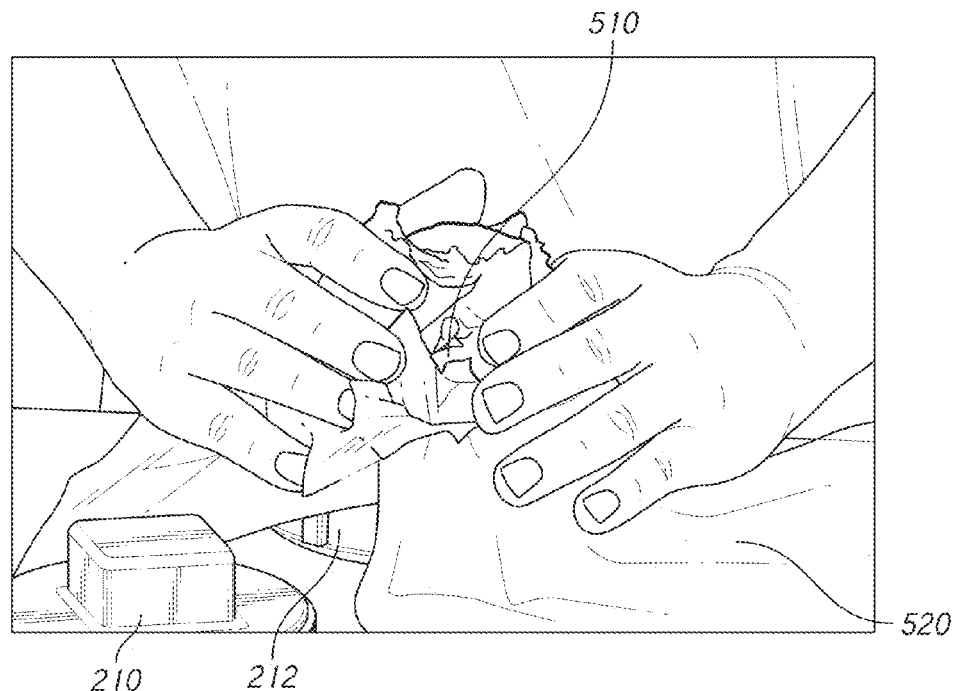

In step five 430, the vegetable product (e.g., a layer of vegetable product) is optionally placed in the mold (e.g., the bun mold top 212). A layer of vegetable product may be a single whole leaf, multiple whole leaves, pieces of leaves, a portion of vegetable product, a puck of vegetable product, etc. A layer of vegetable product may be a single layer. A layer of vegetable product may be multiple sheets of vegetable product, a leaf folded over on itself one or more times, leaves, or pieces of leaves. FIG. 5A illustrates the beginning of the process of placing the vegetable product in the mold: the vegetable product, e.g., a lettuce leaf, is laid across, e.g., centered on, the barrier material 520, e.g., plastic wrap, covering the bun mold top 212. Then, as shown in FIG. 5B, the edges of the vegetable product 510 are folded in on themselves (e.g., gently folded, and eased) while the vegetable product 510 is being forced and/or pushed into the shape of the bun mold top 212. The vegetable product e.g., lettuce leaf may be folded into the center of the bun mold top 212 in any of a number of ways. For example, the vegetable product, e.g., lettuce leaf, may be gently and evenly folded in around the circumference of the bun mold top 212. Simultaneously folding the leaf may advantageously allow a more even distribution of leaf edges within the center of the bun top half 110 or the bun bottom half 112 (e.g., in an almost even, circular pattern). In another example, the vegetable product, e.g., leaf, may be folded in quarters or eighths. For example, folding the vegetable product 510 in quarters may involve the following steps: folding the top (e.g., north) portion of the leaf into the center of the bun bottom half 112; folding the bottom (e.g., south) portion of the leaf into the center of the bun bottom half 112; folding the right (e.g., east) portion of the leaf into the center of the bun bottom half 112; and folding the left (e.g., west) portion of the leaf into the center of the bun bottom half 112. As will be understood, these steps may be performed in any order, e.g.: north, east, south, then west; north, west, south, then east; etc. Folding the vegetable product 510 in eighths may involve many of the same steps, but introduces four additional folds, including northwest, southwest, southeast, and northeast.

FIG. 5B illustrates the vegetable product 510 being gently pushed even further into the mold in a generally circular pattern, as discussed herein. As can be seen, however, the barrier material 520, e.g., plastic lining, remains relatively unfolded as the vegetable product 510 lettuce leaf is folded in on itself. It can also be seen that the various edges and undulations of the lettuce leaf are folded into the center of the bun mold top 212. Folding the various edges and undulations of the lettuce or vegetable product leaf into the center of the bun mold top 212 creates more bulk of the vegetable product in the center of the bun mold top 212, thereby filling out the rounded top of the bun mold top 212 in a similar fashion to a standard bun (such as a standard, dome-topped hamburger bun or a standard, dome-topped hot dog bun).

Figure 5C:
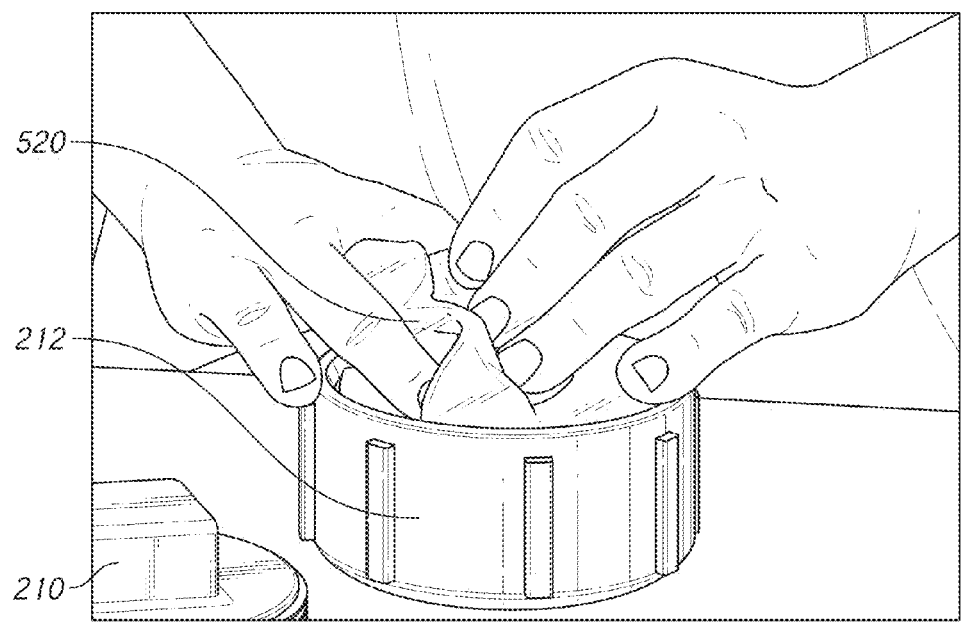

At step six 435, the vegetable product 510 is optionally compressed within the bun mold top 212. FIG. 5C illustrates the vegetable product bun mold set 200 as the vegetable product 510 is being pressed even further into the vegetable product bun mold set 200, nearly to completion (e.g., nearly to the point where the vegetable product 510 is in the shape of the desired bun). The vegetable product 510, e.g., lettuce leaf, is being/has been folded in on itself such that it is beginning to form to the inside of the bun mold top 212. Once the vegetable product 510 has folded in on itself sufficiently, the barrier material 520 (e.g., plastic wrap) may be folded over the vegetable product 510 to allow the vegetable product 510 to be compressed more simply, with less force, or in an easier manner. As will be readily appreciated, when no barrier material 520 is being used, additional lubricating, or other, material may be added to facilitate compression of the vegetable product 510 within the bun mold top 212. However, as shown in FIG. 5C, the barrier material 520 has been folded over the vegetable product 510 already contained within the bun mold top 212 and both the barrier material 520 and the vegetable product 510 are being manually, lightly compressed. While the figures may illustrate manual performance of certain steps of one or more of the methods disclosed herein, it should be understood that any of these methods may be performed mechanically, in an automatic or non-manual fashion.

Figure 5D:
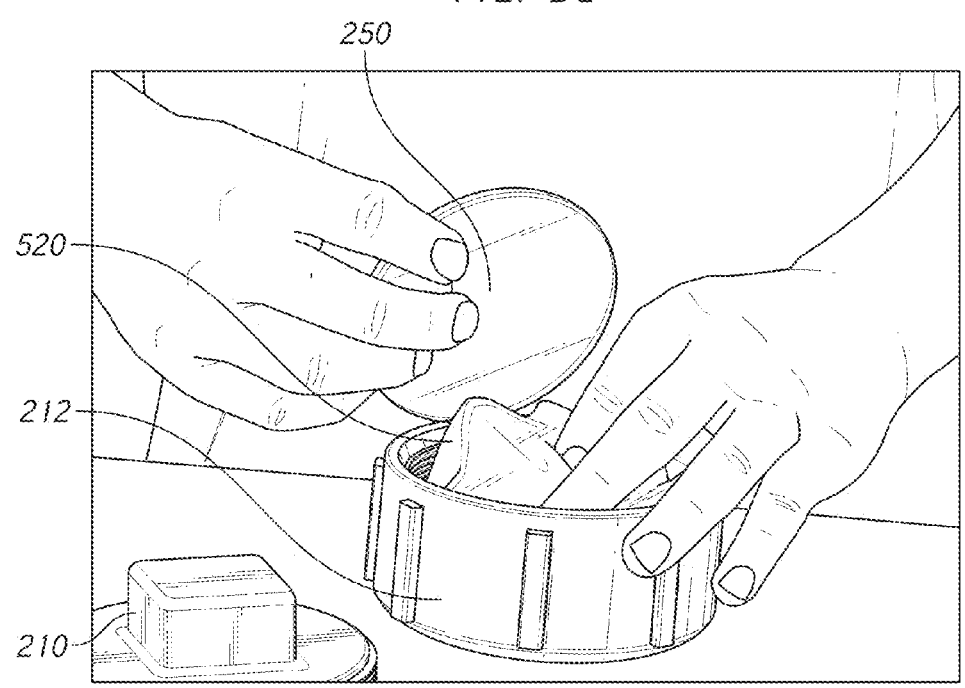
Figure 5E:
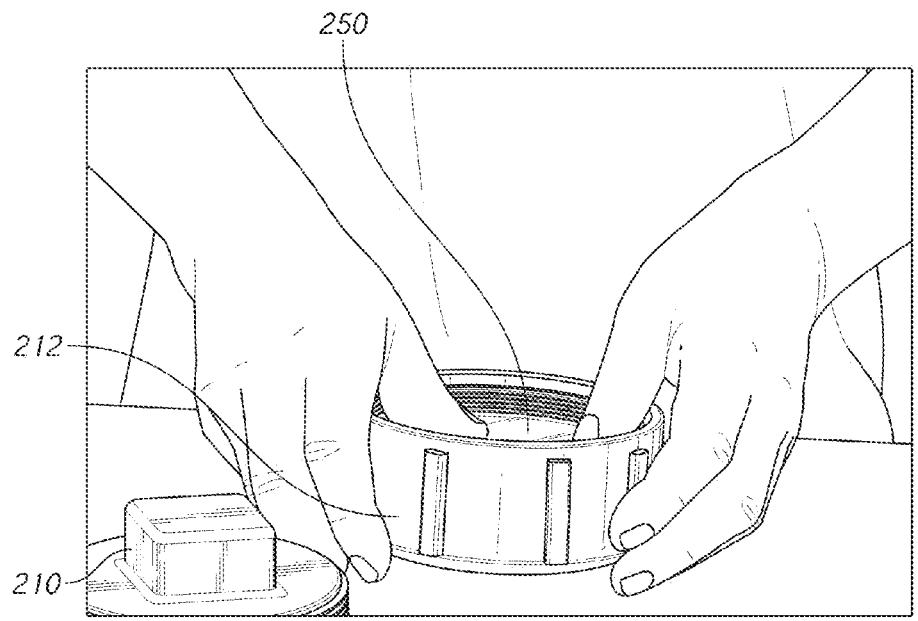

FIG. 5D-5E illustrate compression of the vegetable product 510 using the bun mold compression disk 250. FIG. 5D illustrates introduction of the bun mold compression disk 250, shortly after the step seen in FIG. 5C. FIG. 5E illustrates compression of the vegetable product 510 using the bun mold compression disk 250. The bun mold compression disk 250 may be used to evenly (and, for example, reproducibly) compress the vegetable product 510, e.g., into a bun shape. Using a bun mold compression disk 250 may be simpler than, for example, using one's finger(s), or other tool, to compress the vegetable product 510 contained within the bun mold top 212. When a rounded top of the bun mold top 212 is being used, the first compression of the bun mold compression disk 250 creates the bun top half 110: that is the first portion of vegetable product 510 placed into the bun mold top 212 may create the bun top half 110. When a flat top, or nearly flat top of the bun mold top 212 is being used, the first compression of the bun mold compression disk 250 creates the bun bottom half 112: that is the first portion of vegetable product 510 placed into the bun mold top 212 may create the bun bottom half 112. When the cylindrical wall is deep enough, the bun mold compression disk 250 may be removed and a second layer of vegetable product introduced into the bun mold top 212 to form the bun mold top bun bottom half 112.

An inner surface of the bun mold top 212 may comprise textures or surface features that may be imparted to the vegetable product by/during compression. For example, stitching and/or texture of a baseball, basketball, soccer ball, or other balls, faces, logos, etc. may be embossed on at least a top layer of the lettuce leaf-based bun 100. When such textures or surfaces are present, compression of the vegetable product 510 into the bun mold top 212 may advantageously generate the mirror of the pattern (e.g., the surface features) on the top of the bun top half 110 of the lettuce leaf-based bun 100.

At step seven 440, the bun mold top 212 may optionally be prepared to accept another layer (e.g., a second layer) of vegetable product 510, which, in this instance, may be the bun bottom half 112 of the lettuce leaf-based bun 100. The bun mold top 212 may be prepared in a similar fashion as discussed with respect to step four 425 of the method for producing vegetable product food holders 400. For example, to prepare the bun mold top 212 for a second layer of vegetable product, the bun mold top 212 may have a second layer of lubricating material or barrier material 520 (such as plastic wrap) applied and/or added.

Figure 5F:
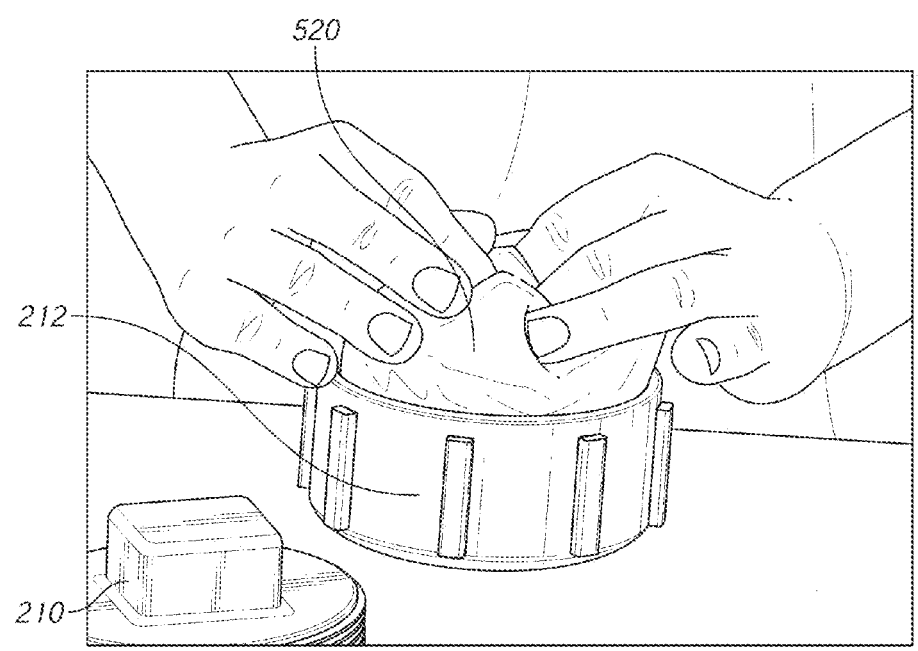

Next at step eight 445, additional vegetable product 510 (e.g., one or more additional leaves, e.g., lettuce leaves) may optionally be placed within the bun mold top 212 or on top of the second layer of plastic wrap (e.g., barrier material 520). FIG. 5F shows a plastic wrap barrier material 520 being folded over onto vegetable product 510 (for forming a second bun portion, e.g., a bun bottom half 112). As shown, the vegetable product 510 was inserted and folded in on itself, as described herein. As shown, the barrier material 520, e.g. plastic wrap, is being folded over on itself as well. This may allow a compressor, whether a bun mold compression disk 250 or the bun mold base 210 (or some other type of compressor, such as a piston, or other compression device) to be inserted over the second layer of vegetable product 510 and to compress the vegetable product 510.

Figure 5G:
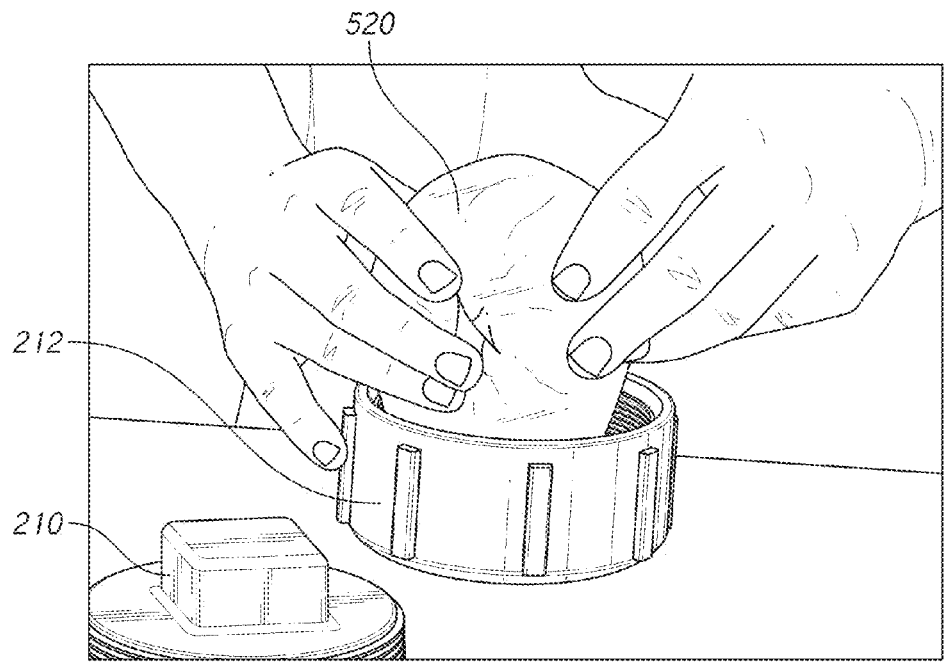
Figure 5H:
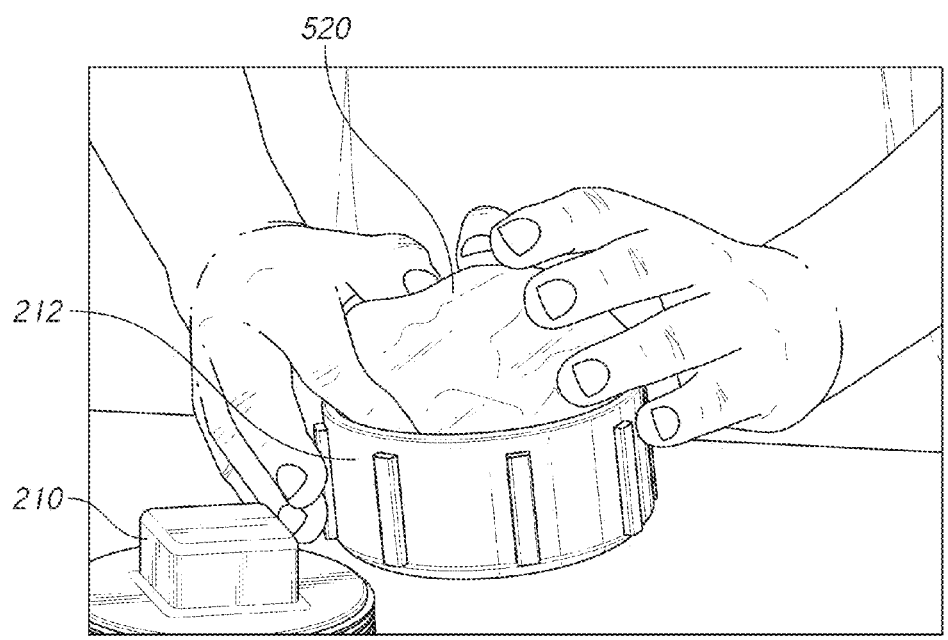

As shown in FIGS. 5G and 5H, the second layer of vegetable product 510, over which the barrier material 520 has been folded, may be lifted out of the bun mold top 212 and flipped over prior to compression of the vegetable product 510. Flipping the second layer of vegetable product 510 and barrier material 520 may present a "cleaner" (e.g., no bunched vegetable product or barrier material 520) surface against which the bun mold compression disk 250 and/or the bun mold base 210 may push, thereby possibly reducing or eliminating binding of the vegetable product and/or the barrier material 520 against the bun mold compression disk 250 and/or the bun bottom half 112. Additionally, flipping the second layer of vegetable product 510 and barrier material 520 may advantageously create a more visually (and possibly tactilely) pleasing, flat bottom surface (whereas were the second layer of vegetable product 510 not flipped, the open expanse of vegetable product 510, such as lettuce leaf, forming the bottom-most surface of the bun bottom half 112 would be formed against bunched up barrier material 520 and vegetable product 510 from the bun top half 110—thereby possibly creating a wavy or bunched bottom portion of the bun bottom half 112).

Figure 5I:
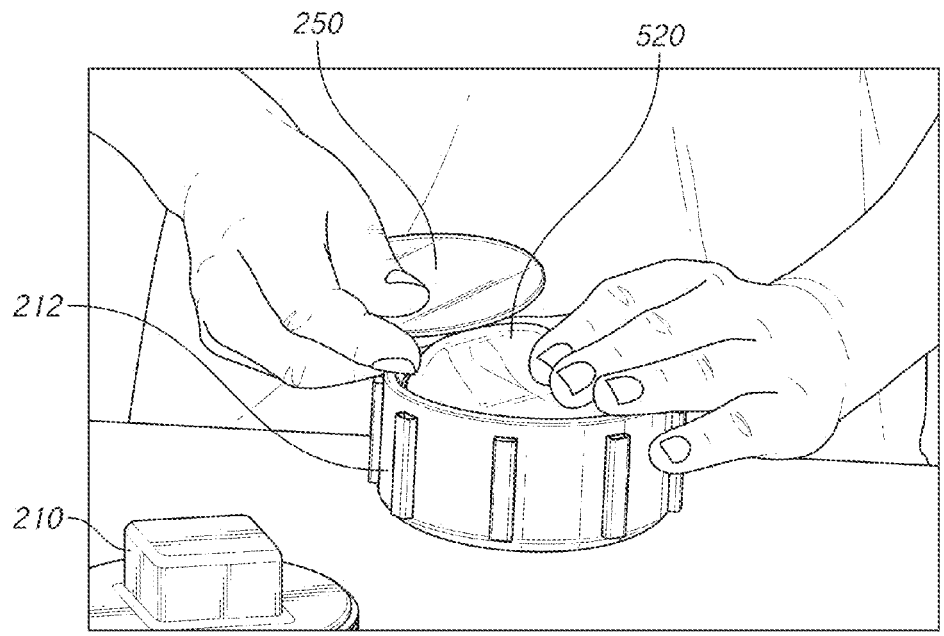
Figure 5J:
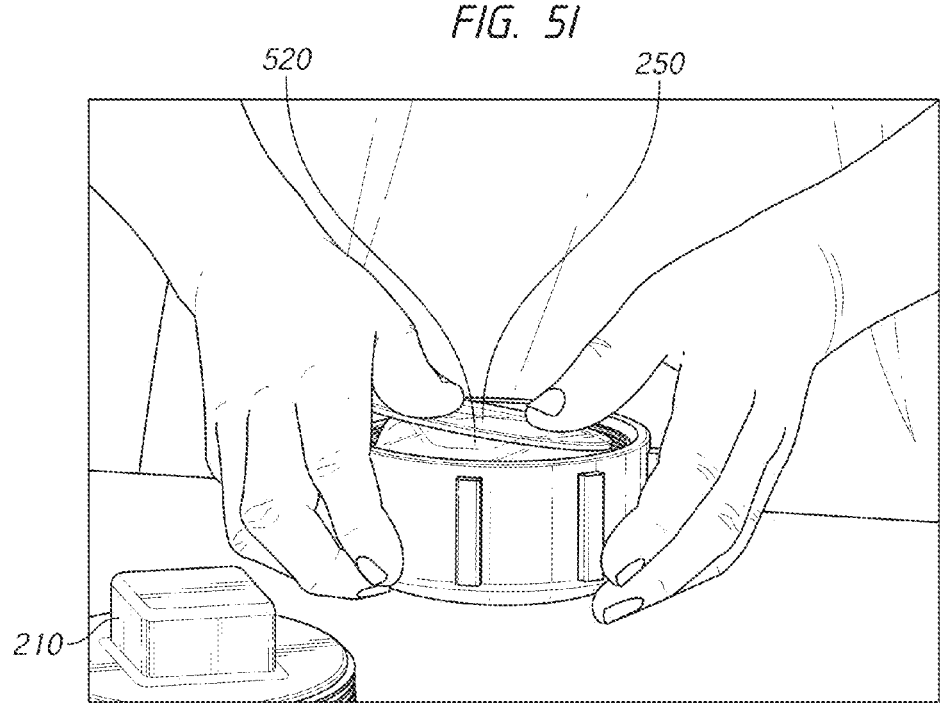

At step nine 450, after the second layer of vegetable product 510 and the barrier material 520 has optionally been flipped over (or even if it hasn't been flipped), the second layer of vegetable product 510 contained within the barrier material 520 may optionally be compressed using the bun mold compression disk 250. For example, as is shown in FIG. 5I, the bun mold compression disk 250 may, once again, be introduced into the bun mold top 212 of the vegetable product bun mold set 200 to compress the second layer of vegetable product 510 (which, may ultimately form the bun bottom half 112). As show in FIG. 5J, the bun mold compression disk 250 may be used to compress the second layer of vegetable product 510, which will ultimately form the bun bottom half 112. Step nine 450 may be performed in substantially the same manner as was discussed herein in connection with step six 435.

Figure 5K:
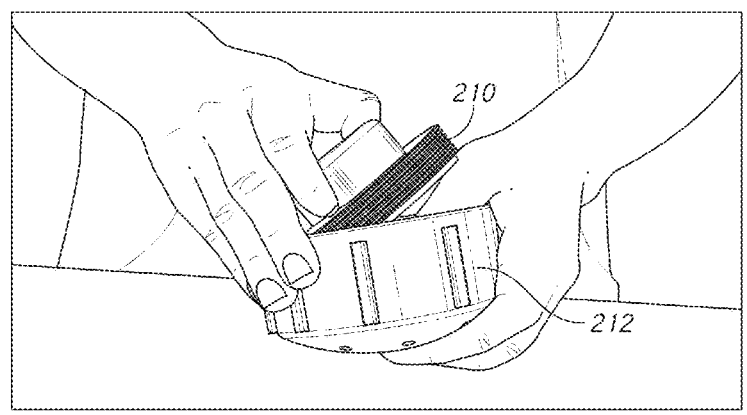
Figure 5L:
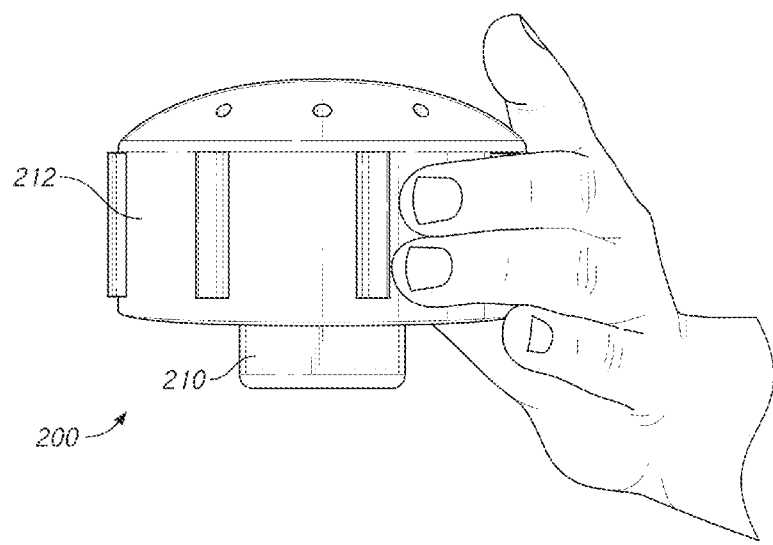

After both the first layer of vegetable product 510 and the second layer of vegetable product 510 have been placed within the bun mold top 212 of the vegetable product bun mold set 200 and compressed using the bun mold compression disk 250, the bun mold base 210 may be inserted in a reversibly lockable fashion, as shown in FIG. 5K. If only one half (e.g., a bun top half 110 or bun bottom half 112) of the lettuce leaf-based bun 100 is being made, the bun mold base 210 may be inserted in a reversibly lockable fashion into the bun mold top 212 after only one later of vegetable product 510 has been placed within the bun mold top 212 of the vegetable product bun mold set 200 and compressed using the bun mold compression disk 250. Subject to the type of bun mold base 210 being used (discussed herein) the bun mold base 210 may be inserted more or less into the bun mold top 212 (e.g., deeper or shallower) on top of or above the vegetable product 510 and thereby increase or decrease the ultimate height of the ultimately produced vegetable product food holder, e.g., the lettuce leaf-based bun 100. Once the bun mold base 210 is in place, the vegetable product bun mold set 200 may be a relatively compact, self-contained unit, e.g., as shown in FIG. 5L.

At any step prior to step nine 450, e.g., step five 430, step eight 445, additional materials may be placed within the vegetable product 510 that is being used to form the lettuce leaf-based bun 100. For example, additional vegetable material may be included, such as, but not limited to, additional whole leaves of the same type as the vegetable product 510 (e.g., a second iceberg lettuce leaf within the a first iceberg lettuce leaf), different whole leaves of a different type as the vegetable product 510 (e.g., a red cabbage leaf within a green cabbage leaf), vegetable product pieces of the same type as the vegetable product 510 (e.g., shredded iceberg lettuce within a first iceberg lettuce leaf), vegetable product pieces of a different type as the vegetable product 510 (e.g., shredded spinach within an iceberg leaf shell). For example, other food products may be included within the vegetable product 510 that is being used to form the lettuce leaf-based bun 100. For example, meat products may be included, such as, but not limited to, shredded pork, ground beef, chicken pieces, barbequed meats, etc. For example, an amount of carbohydrates may be included within the vegetable product 510 that is being used to form the lettuce leaf-based bun 100, including, but not limited to, noodles (e.g., rice noodles, egg noodles, vermicelli, etc.), rice, croutons, chips, pita pieces, etc. For example, condiments may be included within the vegetable product 510 that is being used to form the lettuce leaf-based bun 100, including, but not limited to, ketchup, mustard, mayo, mayonnaise, barbeque sauce, buffalo sauce, hot sauce, sriracha sauce, hoisin sauce, soybean pastes, sweet chili sauce, tobacco sauce, relish, etc. For example, spices and/or seasonings may be included within the vegetable product 510 that is being used to form the lettuce leaf-based bun 100, including, but not limited to, salt, pepper, chili powder, garlic powder, onion powder, oregano, basil, or any other spice or seasoning that may be desired.

In step ten 455, the assembly of the vegetable product bun mold set 200 and the lettuce leaf-based bun 100 contained within the vegetable product bun mold set 200 may optionally be chilled.

The assembly (e.g., the vegetable product bun mold set 200 and the lettuce leaf-based bun 100 contained within the vegetable product bun mold set 200) may be chilled by placing the assembly in a refrigerator for a time. For example, the assembly of the vegetable product bun mold set 200 and the lettuce leaf-based bun 100 may be placed in a refrigerator for less than about 5 minutes, less than about 10 minutes, less than about 15 minutes, less than about 20 minutes, less than about 25 minutes, less than about 30 minutes, less than about 35 minutes, less than about 40 minutes, less than about 45 minutes, or any other length of time useful to form a lettuce leaf-based bun 100 into a set shape. A refrigerator in which the lettuce leaf-based bun 100 may is chilled may be held at about 33-70 degrees, about 34-65 degrees, about 35-60 degrees, about 36-55 degrees, about 36-55 degrees, about 37-50 degrees, about 38-45 degrees, or any other temperature useful to form a lettuce leaf-based bun 100 into a set shape.

The assembly (e.g., the vegetable product bun mold set 200 and the lettuce leaf-based bun 100 contained within the vegetable product bun mold set 200) may be chilled by placing the assembly in a freezer for a time. For example, the assembly of the vegetable product bun mold set 200 and the lettuce leaf-based bun 100 may be placed in a freezer for less than about 1 minute, less than about 2 minutes, less than about 3 minutes, less than about 4 minutes, less than about 5 minutes, less than about 6 minutes, less than about 7 minutes, less than about 8 minutes, less than about 9 minutes, less than about 10 minutes, less than about 15 minutes, less than about 20 minutes, or any other length of time useful to form a lettuce leaf-based bun 100 into a set shape. For example, the freezer is held at about 0-32 degrees, about 5-31 degrees, about 10-30 degrees, about 15-29 degrees, about 20-25 degrees, or any other temperature useful to form a lettuce leaf-based bun 100 into a set shape.

The assembly (e.g., the vegetable product bun mold set 200 and the lettuce leaf-based bun 100 contained within the vegetable product bun mold set 200) may be chilled by spraying the vegetable product bun mold set 200 and the lettuce leaf-based bun 100 contained therein with (or dipping the same into) a cold fluid, such as liquid nitrogen, CO2, or any other cold fluid (note that fluid encompasses both liquids and gasses).

At step eleven 460, the lettuce leaf-based bun 100 may optionally be fixed. Note that step ten 455 and step eleven 460 may be performed after step nine 450. However, the lettuce leaf-based bun 100 may also be fixed prior to step ten 455 (e.g., chilling the compressed vegetable product). The lettuce leaf-based bun 100 may also be fixed after step ten 455 (e.g., after chilling the compressed vegetable product).

Fixing the lettuce leaf-based bun 100 may be done in any of a number of ways, one of which is using the perforator prongs 333 discussed herein. As will be understood with reference to FIGS. 3A-3B, once the lettuce leaf-based bun 100 is formed inside the vegetable product bun mold set 200, the vegetable product bun mold set 200 may be placed in the vegetable product bun perforator jig 300, such as is shown in FIGS. 9A-9B. As discussed herein, the vegetable product bun perforator jig 300 is configured to hold the vegetable product bun mold set 200 below the perforator disk 330 which holds the perforator prongs 333. In use, the vegetable product bun mold set 200 may contain a bun top half 110 and/or or bun bottom half 112 of the lettuce leaf-based bun 100, various filling materials, and one or more layers of barrier material 520 and/or lubricating material. The vegetable product bun mold set 200 may be placed into the vegetable product bun perforator jig 300 (e.g., with the projection on the bun mold base 210 mating with the bun mold centering socket 317) and the vegetable product bun perforator jig 300 may be lowered so that the perforator prongs 333 enter the bun mold perforation holes 215 in the top of the bun mold top 212. The perforator prongs 333 may be extended into the vegetable product bun mold set 200 until they contact (e.g., hit or touch) the bun mold base 210 of the vegetable product bun mold set 200. Then, the perforator prongs 333 may be withdrawn from the bun mold perforation holes 215 of the vegetable product bun mold set 200 (e.g., the perforator disk 330, to which the perforator prongs 333 may be attached, may be retracted to its starting position).

The process of the perforator prongs 333 passing through the vegetable product 510 and its various filings may have any of a number of effects on the lettuce leaf-based bun 100. For example, the perforator prongs 333 passing through the vegetable product 510 while the vegetable product 510 is under compression within the vegetable product bun mold set 200 may cause the lettuce leaf-based bun 100 to hold together better after removal from the vegetable product bun mold set 200. This may occur because the perforator prongs 333 may catch and pull fibers of the vegetable product 510 on their way out, essentially threading the lettuce leaf-based bun 100 together with its own plant material/fiber. The perforator prongs 333 may enter the vegetable product 510 of the lettuce leaf-based bun 100 as they travel along the path, through the bun mold perforation holes 215 of the bun mold top 212, and toward the bun mold base 210 of the vegetable product bun mold set 200. The tips of the perforator prongs 333 pierce the vegetable product 510 until they reach the bun mold base 210 (at which point in time they may be stopped by the bun mold base 210). Then the perforator prongs 333 may be withdrawn from within the vegetable product 510 and the vegetable product bun mold set 200, out of the bun mold perforation holes 215. As the perforator prongs 333 are being withdrawn, the surface of the perforator prongs 333 or features thereon (as will be discussed with respect to FIGS. 10A-10F) attach to or catch small pieces of the vegetable product 510. These small pieces of vegetable product 510 may be pulled along with the perforator prongs 333 as they are being withdrawn and pull through one hole after the next (e.g., the hole(s) created by the perforator prongs 333). Pulling these pieces or fibers of vegetable product through the holes created by the perforator prongs 333 may be similar to sewing pieces of fabric together. As such, the pieces of fibers (from the various layers of vegetable product 510) that are pulled through the holes created by the perforator prongs 333, in effect, "sew" the respective bun top half 110 and bun bottom half 112 of the lettuce leaf-based bun 100 to each other so that they may be more stable upon removal from the vegetable product bun mold set 200. One possible benefit of using a barrier material 520 (e.g., a barrier material 520 separating the vegetable product 510 of the bun mold base 210 and the vegetable product 510 of the bun mold top 212 within the vegetable product bun mold set 200) is that the barrier material 520 between the bun top half 110 and the bun bottom half 112 may advantageously prevent fibers from one half of the lettuce leaf-based bun 100 (e.g., the bun top half 110) being pulled into the other half of the lettuce leaf-based bun 100 (e.g., bun bottom half 112) and "sewing" the two halves of the bun together.

In addition, the perforator prongs 333 may serve to "relax" the bun top half 110 and/or the bun bottom half 112 of the lettuce leaf-based bun 100. As discussed herein, the vegetable product bun mold set 200 is placed into the vegetable product bun perforator jig 300 while the bun top half 110 and/or the bun bottom half 112 are under compression (e.g., generated, initially, by the bun mold compression disk 250, and then by the bun mold base 210). Forcing the perforator prongs 333 through the compressed vegetable product 510 of the lettuce leaf-based bun 100 may create advantageous discontinuities in the vegetable product 510 of the lettuce leaf-based bun 100 thereby allowing it to relax in that specific shape. Relaxation of the vegetable product 510 in the compressed shape may render it more likely to hold to that shape.

Figure 6A:
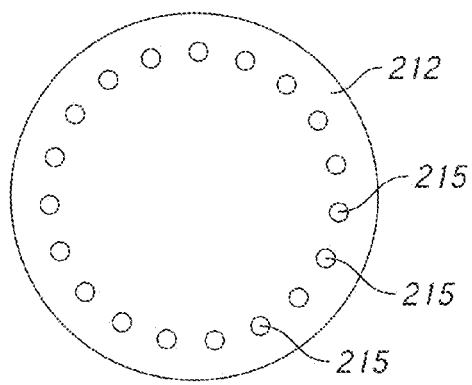
FIGS. 6A-6D are various dimensional configurations of bun mold perforation holes on the top of an embodiment of a bun mold top, such as shown in FIG. 2A.
Figure 6B:
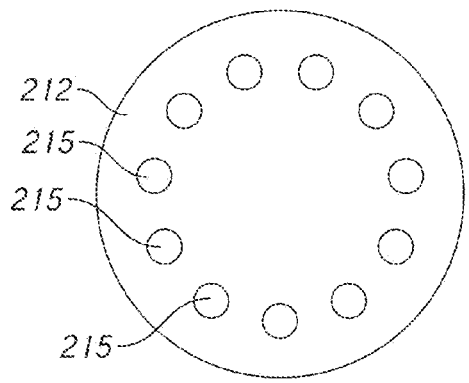
Figure 6C:
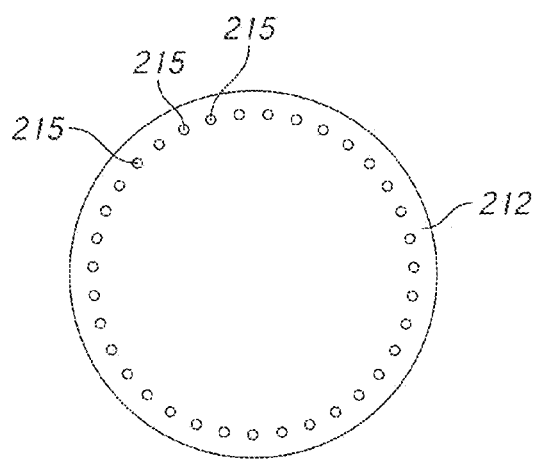
Figure 6D:
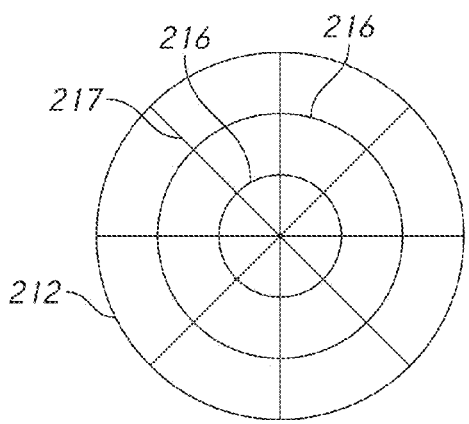

As will be understood, varying the number, size, and pattern of the perforator prongs 333 may advantageously change the properties of the lettuce leaf-based bun 100. This may be particularly useful depending on the type of material out of which the lettuce leaf-based bun 100 is being made and/or the size of the lettuce leaf-based bun 100 to be produced. FIGS. 6A-6D illustrate various different bun mold top 212 having different sizes of bun mold perforation holes 215, which are configured to accept different numbers, sizes, and/or shapes of perforator prongs 333. FIG. 6B shows a bun mold top 212 having bun mold perforation holes 215 that are similar in size to those shown in FIG. 2C and arranged in a ring around the outer circumference of the bun mold top 212. FIGS. 6A and 6C illustrate bun mold tops 212 that have bun mold perforation holes 215 that are also arranged in a ring around the outer circumference of the bun mold top 212, but that are smaller and more numerous than the bun mold perforation holes 215 shown in either FIG. 6B or FIG. 2C. For example, FIG. 6A illustrates about 19 medium sized bun mold perforation holes 215 placed around the outer circumference of the bun mold top 212. Such an increased number of bun mold perforation holes 215 may increase the relaxing effect of the potentially increased number of perforator prongs 333 and/or it may increase the holding power allowed by the draw-through of the potentially increased number of perforator prongs 333 (e.g., a higher number of perforator prongs 333 may allow more fibers or pieces of the vegetable product 510 to be pulled through, and a stronger sewing "seam" to be created). FIG. 6C illustrates about 34 smaller sized bun mold perforation holes 215 placed around the outer circumference of the bun mold top 212. Such an increased number of bun mold perforation holes 215 may increase the relaxing effect of the potentially increased number of perforator prongs 333 and/or it may increase the holding power allowed by the draw-through of the potentially increased number of perforator prongs 333 (e.g., a higher number of perforator prongs 333 may allow more fibers or pieces of the vegetable product 510 to be pulled through, and a stronger sewing "seam" to be created). FIG. 6D illustrates an alternate solution to individual bun mold perforation holes 215. For example, the top of the bun mold top 212 may be formed with a number of circular wire brace 216 (while two circular wire braces 216 are shown, any number can be used) and a number of radial wire braces 217

(while three diameter-length (or six radius-length) radial wire braces 217 are shown, any number can be used). The circular wire braces 216 and the radial wire braces 217 leave significant portions of the top surface of the bun mold top 212 open to the interior of the vegetable product bun mold set 200. Therefore, there is less of a need to align the vegetable product bun mold set 200 with the perforator disk 330 and the perforator prongs 333 (e.g., the perforator prongs 333 are unlikely to hit the small-diameter circular wire brace 216 or 217). As will be understood, when a set of circular wire braces 216 and radial wire braces 217 are used instead of individually defined bun mold perforation holes 215, the number, size, and/or shape of the perforator prongs 333 may be advantageously changed without the need to change the bun mold top 212 being used.

Figure 7A:
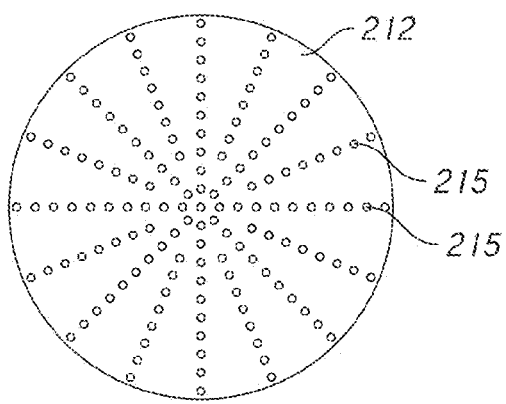
FIGS. 7A-7D are various positional configurations of bun mold perforation holes on the top of an embodiment of a bun mold top, such as shown in FIG. 2A.
Figure 7B:
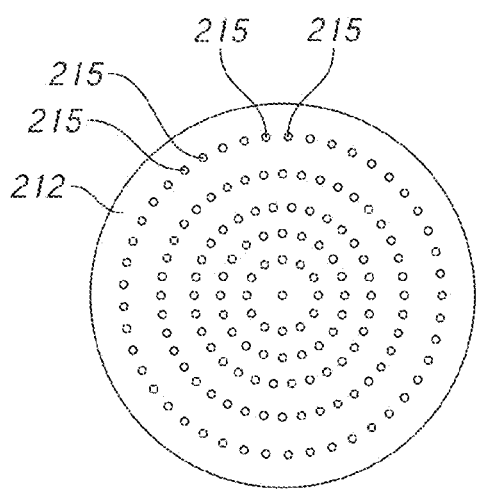
Figure 7C:
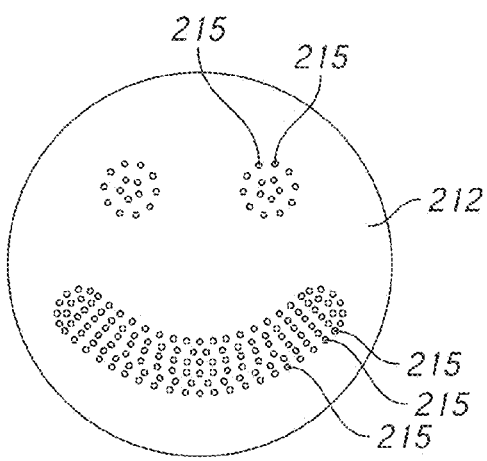
Figure 7D:
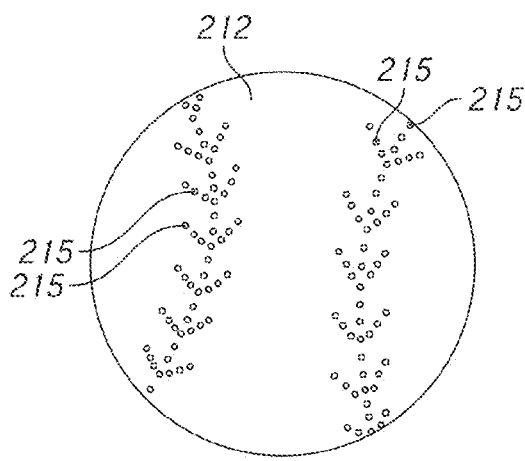

Each of FIGS. 6A-6D illustrates a bun mold top 212 having a ring of bun mold perforation holes 215, configured to accept a ring of perforator prongs 333, around the outer circumference of the top of the bun mold top 212. However, any configuration of bun mold perforation holes 215 may be used. FIGS. 7A-7D illustrate various configurations of smaller and numerous bun mold perforation holes 215. For example, FIG. 7A illustrates a number of bun mold perforation holes 215 on the top surface of a bun mold top 212 in a radial pattern, rather than a circumferential patter. For example, FIG. 7B illustrates a number of bun mold perforation holes 215 on the top surface of a bun mold top 212 in concentric circumferential patterns. For example, FIGS. 7C-7D illustrate a number of bun mold perforation holes 215 on the top surface of a bun mold top 212 in recognizable patterns that may be attractive to the consumer, e.g., children. FIG. 7C shows the bun mold perforation holes 215 arranged in a "smiley face," while FIG. 7D shows the bun mold perforation holes 215 arranged in a "baseball stitch" pattern. Of course, it will be understood that the teachings of FIGS. 6A-6D and 7A-7D may be combined, that is to say that small or large bun mold perforation holes 215 may be arranged in any pattern desired, for example, depending upon several factors, including, but not limited to, the size, shape, and number of perforator prongs 333 being used, the holding power desired for the lettuce leaf-based bun 100 to be produced, the size of the lettuce leaf-based bun 100 to be produced, etc.

FIGS. 10A-10F illustrate several different possible tips for the perforator prongs 333. Each different tip has a prong tip diameter 1002, which may be less than about 0.12 inches, less than about 0.11 inches, less than about 0.10 inches, less than about 0.09 inches, less than about 0.08 inches, less than about 0.07 inches, less than about 0.06 inches, less than about 0.05 inches, less than about 0.04 inches, less than about 0.03 inches, less than about 0.02 inches, or any other diameter that may advantageously tip the perforator prongs 333. The prong tip diameter 1002 may be the same as the diameter of the perforator prongs 333. Or, the prong tip diameter 1002 may be different than the diameter of the perforator prongs 333.

FIG. 10A illustrates a cylindrical needle prong 1010 having a hollow shaft with a needle lumen 1012 and a cylindrical needle point 1011. The needle lumen 1012 of the cylindrical needle prong 1010 may allow the cylindrical needle prong 1010 to "core" material out of the vegetable product when the perforator prongs 333 are forced through the vegetable product. Depending on the type of vegetable product being used and the size and number of perforator prongs 333 being used, coring some of the material may advantageously improve the feel of the lettuce leaf-based bun 100 produced, e.g., making it more flexible or otherwise better. The cylindrical needle prong 1010 may be larger or smaller, depending on the needs of the user.

FIG. 10B illustrates a pin prong 1020 having solid shaft and a sharp pin point 1021. Pin prongs 1020 such as that shown in FIG. 10B may be useful in relaxing vegetable product and/or improving the flexibility of a vegetable product, such as discussed herein. The pin prong 1020 may be larger or smaller, depending on the needs of the user.

FIG. 10C illustrates a diagonal needle prong 1030 having a hollow shaft with a needle lumen 1032 and a diagonal needle point 1031. The needle lumen 1032 of the diagonal needle prong 1030 may allow the diagonal needle prong 1030 to "core" material out of the vegetable product when the perforator prongs 333 are forced through the vegetable product. And, the diagonal needle point 1031 may allow the perforator prongs 333 to be pushed through the vegetable product with less force. Depending on the type of vegetable product being used and the size and number of perforator prongs 333 being used, coring some of the material may advantageously improve the feel of the lettuce leaf-based bun 100 produced, e.g., making it more flexible or otherwise better. The diagonal needle prong 1030 may be larger or smaller, depending on the needs of the user.

FIG. 10D illustrates a hook prong 1040 having a hook point 1041, hook 1043, hook tip 1044, and hook notch 1045. Similarly, FIG. 10E illustrates an arrow prong 1050 having a 1051, arrow point 1053, two arrow tips 1054, and therefore two arrow notches 1055. Prongs having notches and or hooks may advantageously be able to "catch" and "pull" more fibers and/or pieces of vegetable product on their return path back out of the vegetable product and the vegetable product bun mold set 200. Therefore, the hook prong 1040 may advantageously be able to impart a stronger holding force on the ultimately produced lettuce leaf-based bun 100. Either the hook prong 1040 and/or the arrow prong 1050 may be larger or smaller, depending on the needs of the user.

FIG. 10F illustrates a corkscrew prong 1060 having a corkscrew prong point 1061 and a corkscrew canted turn 1066. In operation, the corkscrew canted turn 1066 may be rotationally "screwed" into the vegetable product, largely without tearing the vegetable product and thereby creating only a spiral or helical pattern of holes through the vegetable product. However, upon retraction, the corkscrew prong 1060 may be linearly withdrawn from within the vegetable product thereby catching a much larger portion of the vegetable product and pulling much more of the vegetable product through its exit hole as it is withdrawn. Therefore, the corkscrew prong 1060 may advantageously be able to impart a stronger holding force on the ultimately produced lettuce leaf-based bun 100. The corkscrew prong 1060 may be larger or smaller, depending on the needs of the user.

It will be understood that each prong tip shown in FIGS. 10A-10F may have a different effect on the vegetable product as it is advanced into the bun mold top 212 and through the vegetable product, and then, also, as it is withdrawn from the vegetable product and out of the bun mold top 212. Therefore, depending on the needs of the user, any combination of prong tips shown in FIGS. 10A-10F may be used to tailor the bun making process. For example, bun mold top 212 shown in FIG. 7B, each alternating circumferential ring can be a different type of prong. Hook prongs (such as the hook prong 1040 and/or the arrow prong 1050) may be used more towards the center of the bun mold top 212 where holding power may be more desirable (and flexibility may be less desirable) while pin or coring prongs (such as the cylindrical needle prong 1010, pin prong 1020, or diagonal needle prong 1030) may be used toward the outer edge of the bun mold top 212 where relaxation and/or flexibility may be more desirable (and holding power may be of lesser importance).

Figure 8A:
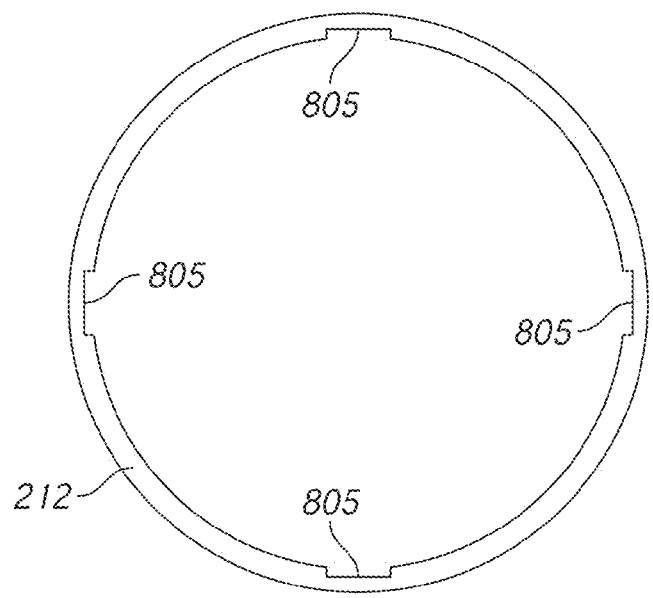
FIGS. 8A-8B is an embodiment of a keyed vegetable product bun mold set.
Figure 8B:
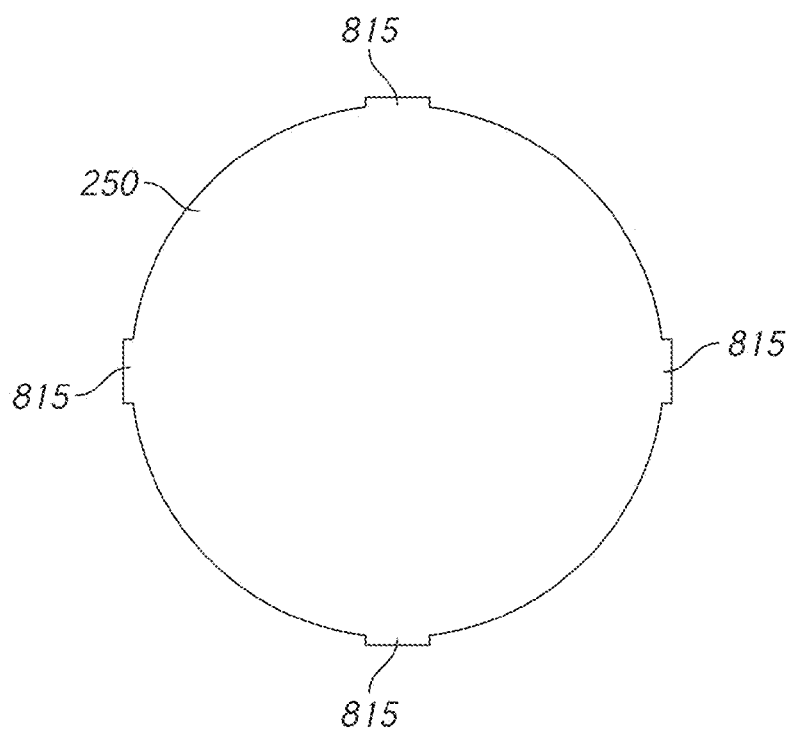

As discussed herein, with respect to FIGS. 5D-5E and 5I-5J, the bun mold compression disk 250 may be used to compress the vegetable product 510 within the bun mold top 212, which may, sometimes, also contain the barrier material 520. The bun mold compression disk 250 is generally removed after it is used to compress the vegetable product 510. It is generally removed because, as shown in certain of the figures, it is a sold compression disk that would not easily allow the perforator prongs 333 to pass into the second layer of vegetable product 510. Were only one layer of vegetable product 510 being used (e.g., when only a bun top half 110 or a bun bottom half 112 is being formed), the bun mold compression disk 250 may be left in place and the bun mold base 210 inserted. In that case, the perforator prongs 333 only need to penetrate one a single layer of vegetable product 510 and will hit the bun mold compression disk 250 (when the vegetable product bun perforator jig 300 is being used) instead of the bun mold base 210. FIGS. 8A-8B illustrate a system, including a keyed bun mold compression disk 250, that may be used to perforate two layers of vegetable product 510 at the same time, while leaving the bun mold compression disk 250 in place.

FIG. 8A illustrates a keyed bun mold top 212 having a number of inset slots 805. FIG. 8B illustrates a keyed bun mold compression disk 250 having a number of raised alignment teeth 815. Each raised alignment tooth 815 (e.g., tab, raised portion, etc.) of the bun mold compression disk 250 is configured to mate with a corresponding inset slot 805 of the bun mold top 212. Therefore, the bun mold compression disk 250 may only be inserted into the bun mold top 212 in a set number of positions. The bun mold compression disk 250 and the bun mold top 212 may have varying number of teeth and slots/recesses. For example, the bun mold compression disk 250 may have a single raised alignment tooth 815 and the bun mold top 212 may have a single inset slot 805; consequently the bun mold compression disk 250 may only be inserted into the bun mold top 212 in a single position (e.g., when the tooth of the bun mold compression disk 250 is aligned with the slot of the bun mold top 212). Each raised alignment tooth 815 of the bun mold compression disk 250 may have a different width and each inset slot 805 of the bun mold top 212 may have a corresponding width; consequently the bun mold compression disk 250 may, again, only be inserted into the bun mold top 212 in a single position. Keys and slots may be arranged in a number of configurations. For example, the bun mold compression disk 250 may have a number of inset slots and the bun mold top 212 may have a number of raised alignment teeth configured to mate with the inset slots of the bun mold compression disk 250. For example, the bun mold compression disk 250 may have a number of inset slots and alignment teeth and the bun mold top 212 may have a number of inset slots and alignment teeth configured to mate with the inset slots and alignment keys of the bun mold compression disk 250. It will be understood that any keying system may be used. The keyed bun mold compression disk 250 may have holes corresponding to the bun mold perforation holes 215 on the bun mold top 212. Thus, when the keyed bun mold compression disk 250 is placed within the keyed bun mold top 212, the holes in the keyed bun mold compression disk 250 may advantageously line up with the bun mold perforation holes 215 of the keyed bun mold top 212. As such, the keyed bun mold compression disk 250 (with corresponding holes) may be left in place while the perforator prongs 333 are advanced into the vegetable product bun mold set 200 and through the vegetable product 510. Leaving the keyed bun mold compression disk 250 in place may advantageously improve the shaping of the lettuce leaf-based bun 100 as the two halves of the lettuce leaf-based bun 100, e.g., the bun top half 110 and bun bottom half 112, are kept separately under pressure during fixing and cooling.

Referring again to FIG. 4, at step twelve 465, after one or both of step eleven 460 and step ten 455, the lettuce leaf-based bun 100 may be removed from the vegetable product bun mold set 200 and may be ready for consumption or storage.

The foregoing description and examples has been set forth merely to illustrate the disclosure and are not intended as being limiting. Each of the disclosed aspects and embodiments of the present disclosure may be considered individually or in combination with other aspects, embodiments, and variations of the disclosure. In addition, unless otherwise specified, none of the steps of the methods of the present disclosure are confined to any particular order of performance. Modifications of the disclosed embodiments incorporating the spirit and substance of the disclosure may occur to persons skilled in the art and such modifications are within the scope of the present disclosure. Furthermore, all references cited herein are incorporated by reference in their entirety.

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although systems and methods for and of making vegetable product food holders have been disclosed in the context of certain embodiments and examples, this disclosure extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of systems and methods for and of making vegetable product food holders. The scope of this disclosure should not be limited by the particular disclosed embodiments described herein.

Certain features that are described in this disclosure in the context of separate implementations can be implemented in combination in a single implementation. Conversely, various features that are described in the context of a single implementation can be implemented in multiple implementations separately or in any suitable subcombination. Although features may be described herein as acting in certain combinations, one or more features from a claimed combination can, in some cases, be excised from the combination, and the combination may be claimed as any subcombination or variation of any subcombination.

While the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various embodiments described and the appended claims. Further, the disclosure herein of any particular feature, aspect, method, property, characteristic, quality, attribute, element, or the like in connection with an embodiment can be used in all other embodiments set forth herein. Any methods disclosed herein need not be performed in the order recited. Depending on the embodiment, one or more acts, events, or functions of any of the algorithms, methods, or processes described herein can be performed in a different sequence, can be added, merged, or left out altogether (e.g., not all described acts or events are necessary for the practice of the algorithm). In some embodiments, acts or events can be performed concurrently, e.g., through multi-threaded processing, interrupt processing, or multiple processors or processor cores or on other parallel architectures, rather than sequentially. Further, no element, feature, block, or step, or group of elements, features, blocks, or steps, are necessary or indispensable to each embodiment. Additionally, all possible combinations, subcombinations, and rearrangements of systems, methods, features, elements, modules, blocks, and so forth are within the scope of this disclosure. The use of sequential, or time-ordered language, such as "then," "next," "after," "subsequently," and the like, unless specifically stated otherwise, or otherwise understood within the context as used, is generally intended to facilitate the flow of the text and is not intended to limit the sequence of operations performed. Thus, some embodiments may be performed using the sequence of operations described herein, while other embodiments may be performed following a different sequence of operations.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described herein should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying figures. Certain figures are drawn and/or shown to scale, but such scale should not be limiting, since dimensions and proportions other than what are shown are contemplated and are within the scope of the embodiments disclosed herein. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

The methods disclosed herein may include certain actions taken by a practitioner; however, the methods can also include any third-party instruction of those actions, either expressly or by implication. For example, actions such as "positioning an electrode" include "instructing positioning of an electrode."

In summary, various embodiments and examples of systems and methods for and of making vegetable product food holders have been disclosed. Although the systems and methods for and of making vegetable product food holders have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described herein, but should be determined only by a fair reading of the claims that follow.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 1 V" includes "1 V." Phrases preceded by a term such as "substantially" include the recited phrase and should be interpreted based on the circumstances (e.g., as much as reasonably possible under the circumstances). For example, "substantially perpendicular" includes "perpendicular." Unless stated otherwise, all measurements are at standard conditions including temperature and pressure.

What is claimed is:

1. A method of forming a food holder out of a vegetable product, the method comprising:
    placing a first portion of the vegetable product into a mold and forming the first portion of the vegetable product to an inner surface of the mold,
    the vegetable product comprising lettuce,
    the mold comprising a plurality of openings configured to accept a plurality of tines and having a shape of one of:
        a hamburger bun,
        a hot dog bun, and
        a sub sandwich bun; placing a second portion of the vegetable product into the mold and forming the second portion of the vegetable product to the inner surface of the mold;
    after placing and forming at least one of the first portion and the second portion of the vegetable product, compressing the first portion of the vegetable product in the mold;
    after compressing, closing the mold;
    after closing, advancing the plurality of tines at least partially through the first portion of the vegetable product;
    after advancing, retracting the plurality of tines from the first portion of the vegetable product,
        wherein retracting the plurality of tines comprises leaving a plurality of holes in the first portion of the vegetable product,
        wherein retracting the plurality of tines comprises pulling at least one of pieces of the first portion of the vegetable product and fibers of the first portion of the vegetable product through at least one hole of the plurality of holes in the first portion of the vegetable product;
    after retracting, chilling the first portion of the vegetable product;
    after chilling, opening the mold; and
    after opening, removing the first portion and the second portion of the vegetable product from the mold, wherein the removed first portion and second portion of the vegetable product substantially retain the shape of the mold and are configured to be used as one of a hamburger bun, a hot dog bun, and a sub sandwich bun.

2. The method of forming a food holder out of a vegetable product of claim 1, wherein forming the first portion comprises positioning a plurality of leaves of the lettuce over each other.

3. The method of forming a food holder out of a vegetable product of claim 1, wherein forming the first portion comprises folding a first part of a leaf of the lettuce relative to a second part of the leaf of the lettuce.

4. The method of forming a food holder out of a vegetable product of claim 1, further comprising placing a first sheet of barrier material into the mold before placing the first portion of the vegetable product into the mold.

5. A method of forming a food holder out of a vegetable product, the method comprising:
    placing a first layer of the vegetable product into a mold, the mold having a shape of one of a hamburger bun and a sub sandwich bun;
    forming the first layer of the vegetable product to an inner surface of the mold;
    placing a second layer of the vegetable product into the mold;
    closing the mold;
    pushing a plurality of perforator prongs through the first layer of the vegetable product and the second layer of the vegetable product while in the closed mold, wherein pushing the plurality of perforator prongs comprises creating a plurality of holes through the first layer of the vegetable product and the second layer of the vegetable product;
    chilling the closed mold; and
    removing the first layer and the second layer from the mold, wherein after removing, the first layer has a first shape and the second layer has a second shape different than the first shape, wherein the removed first layer and second layer substantially retain the shape of the mold and are configured to be used as one of a hamburger bun, a hot dog bun, and a sub sandwich bun.

6. The method of forming a food holder out of a vegetable product of claim 5, wherein the first shape comprises a domed top and the second shape comprises a flat bottom.

7. The method of forming a food holder out of a vegetable product of claim 5, wherein the first shape comprises a first thickness and the second shape comprises a second thickness less than the first thickness.

8. The method of forming a food holder out of a vegetable product of claim 5, further comprising compressing at least one of the first layer of the vegetable product and the second layer of the vegetable product in the mold.

9. The method of forming a food holder out of a vegetable product of claim 5, further comprising at least one of:
    pulling at least one of pieces and fibers of the first layer of the vegetable product through at least one hole of the plurality of holes in the first layer of the vegetable product using the plurality of perforator prongs; and pulling at least one of pieces and fibers of the second layer of the vegetable product through at least one hole of the plurality of holes in the second layer of the vegetable product using the plurality of perforator prongs.

10. The method of forming a food holder out of a vegetable product of claim 5, wherein pushing the plurality of perforator prongs through the first layer of vegetable product and the second layer of vegetable product is prior to chilling the mold.

11. The method of forming a food holder out of a vegetable product of claim 5, wherein the vegetable product comprises lettuce.

12. The method of forming a food holder out of a vegetable product of claim 5, further comprising at least one of:
   perforating the first layer of the vegetable product prior to placing the first layer of the vegetable product into the mold; and
   perforating the second layer of the vegetable product prior to placing the second layer of the vegetable product into the mold.

13. A method of forming a food holder out of a vegetable product, the method comprising:
   placing a first portion of the vegetable product into the mold and forming the first portion of the vegetable product to an inner surface of the mold; placing a second portion of the vegetable product into a mold and forming the second portion of the vegetable product to the inner surface of the mold;
   closing the mold;
   after placing the first portion of the vegetable product into the mold and forming the first portion of the vegetable product to an inner surface of the mold and, while the mold is closed, advancing a plurality of tines at least partially through the first portion of the vegetable product;
   retracting the plurality of tines from the first portion of the vegetable product,
      wherein retracting the plurality of tines comprises leaving a plurality of holes in the first portion of the vegetable product,
      wherein retracting the plurality of tines comprises pulling at least one of pieces of the first portion of the vegetable product and fibers of the first portion of the vegetable product through at least one hole of the plurality of holes in the first portion of the vegetable product; and removing the first portion of the vegetable product and the second portion of the vegetable product from the mold, wherein the removed first portion and second portion of the vegetable product substantially retain the shape of the mold and are configured to be used as one of a hamburger bun, a hot dog bun, and a sub sandwich bun.

14. The method of forming a food holder out of a vegetable product of claim 13, wherein the mold comprises a plurality of openings configured to accept the plurality of tines.

15. The method of forming a food holder out of a vegetable product of claim 13, further comprising:
   chilling the first portion of the vegetable product.

16. The method of forming a food holder out of a vegetable product of claim 15, wherein advancing the plurality of tines at least partially through the first portion of the vegetable product is prior to chilling the first portion of the vegetable product.

17. The method of forming a food holder out of a vegetable product of claim 13, further comprising compressing the first portion of the vegetable product in the mold.

18. The method of forming a food holder out of a vegetable product of claim 13, further comprising perforating the first portion of the vegetable product prior to placing the first portion of the vegetable product into the mold.

19. The method of forming a food holder out of a vegetable product of claim 13, comprising:
   advancing the plurality of tines at least partially through the second portion of the vegetable product; and
   retracting the plurality of tines from the second portion of the vegetable product,
      wherein retracting the plurality of tines comprises leaving a plurality of holes in the second portion of the vegetable product, and
      wherein retracting the plurality of tines comprises pulling at least one of pieces and fibers of the second portion of the vegetable product through at least one hole of the plurality of holes in the second portion of the vegetable product.

20. The method of forming a food holder out of a vegetable product of claim 13, comprising:
   chilling the second portion of the vegetable product.

21. The method of forming a food holder out of a vegetable product of claim 20, wherein advancing the plurality of tines at least partially through the second portion of the vegetable product is prior to chilling the second portion of the vegetable product.

22. The method of forming a food holder out of a vegetable product of claim 13, further comprising compressing the second portion of the vegetable product in the mold.

23. The method of forming a food holder out of a vegetable product of claim 13, further comprising perforating the second portion of the vegetable product prior to placing the second portion of the vegetable product into the mold.

24. The method of forming a food holder out of a vegetable product of claim 13, wherein the vegetable product comprises lettuce.

25. The method of forming a food holder out of a vegetable product of claim 13, wherein the mold has a shape of one of:
   a hamburger bun,
   a hot dog bun, and
   a sub sandwich bun.

26. The method of forming a food holder out of a vegetable product of claim 1, further comprising:
   before placing the first portion of the vegetable product into the mold, lining at least a portion of the inner surface of the mold with a flexible liner.

* * * * *

UNITED STATES PATENT AND TRADEMARK OFFICE
CERTIFICATE OF CORRECTION

PATENT NO. : 9,894,927 B1  
APPLICATION NO. : 15/621977  
DATED : February 20, 2018  
INVENTOR(S) : Roldan It is certified that error appears in the above-identified patent and that said Letters Patent is hereby corrected as shown below:

In Column 33 at Line 24, In Claim 13, change "the" to --a--.

In Column 33 at Line 27, In Claim 13, change "a" to --the--.

Signed and Sealed this
Tenth Day of July, 2018

Andrei Iancu
*Director of the United States Patent and Trademark Office*